US012501036B2

(12) United States Patent
Wang

(10) Patent No.: US 12,501,036 B2
(45) Date of Patent: Dec. 16, 2025

(54) METHOD FOR INTRA PREDICTION, ENCODER AND DECODER

(71) Applicant: GUANGDONG OPPO MOBILE TELECOMMUNICATIONS CORP., LTD., Dongguan (CN)

(72) Inventor: Fan Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/608,275

(22) Filed: Mar. 18, 2024

(65) Prior Publication Data
US 2024/0223757 A1 Jul. 4, 2024

Related U.S. Application Data

(63) Continuation of application No. PCT/CN2021/121046, filed on Sep. 27, 2021.

(51) Int. Cl.
*H04N 19/11* (2014.01)
*H04N 19/119* (2014.01)
(Continued)

(52) U.S. Cl.
CPC .......... *H04N 19/11* (2014.11); *H04N 19/119* (2014.11); *H04N 19/159* (2014.11); *H04N 19/176* (2014.11); *H04N 19/593* (2014.11)

(58) Field of Classification Search
None
See application file for complete search history.

(56) References Cited

U.S. PATENT DOCUMENTS

2017/0374369 A1 12/2017 Chuang
2019/0166370 A1 5/2019 Xiu
(Continued)

FOREIGN PATENT DOCUMENTS

| CN | 112292854 A | 1/2021 |
| WO | 2017192995 A1 | 11/2017 |

OTHER PUBLICATIONS

Cao, Keming et al. "JVET-W0123-v1: EE2-related: Fusion for Template-based Intra Mode Derivation", Joint Video Experts Team (JVET) of ITU-T SG 16 WP 3 and ISO/IEC JTC 1/SC 29 23rd Meeting, by teleconference, Jul. 7-16, 2021, Jul. 16, 2021 (Jul. 16, 2021), sections 1 and 2. 4 pages.
(Continued)

*Primary Examiner* — Christopher Braniff
(74) *Attorney, Agent, or Firm* — BAYES PLLC

(57) ABSTRACT

A method for intra prediction, applied to an encoder, the method includes: a prediction mode parameter of a current block is acquired, herein the prediction mode parameter indicates that an intra prediction value of the current block is determined by using a Template-based Intra Mode Derived (TIMD) mode; a template of the current block is determined, herein the template includes at least two sub-templates; a weight of each of at least two prediction modes on a first unit of the current block is determined according to respective costs of the at least two prediction modes on a first sub-template, herein the at least two sub-templates include the first sub-template; and the intra prediction value of the current block is determined according to the respective weights of the at least two prediction modes on the first unit.

20 Claims, 15 Drawing Sheets

(51) Int. Cl.
  *H04N 19/159*  (2014.01)
  *H04N 19/176*  (2014.01)
  *H04N 19/593*  (2014.01)

(56) References Cited

U.S. PATENT DOCUMENTS

2019/0215521 A1   7/2019   Chuang et al.
2020/0145668 A1   5/2020   Kotra et al.
2024/0275941 A1*  8/2024   Zhang ................... H04N 19/11

OTHER PUBLICATIONS

Wang, Yang et al. "JVET-V0098-v2: EE2-related: Template-based Intra Mode Derivation Using MPMs", Joint Video Experts Team (JVET) of ITU-T SG 16 WP 3 and ISO/EC JTC 1/SC 29 22nd Meeting, by teleconference, Apr. 20-28, 2021, Apr. 28, 2021 (Apr. 28, 2021), entire document. 4 pages.
International Search Report in the international application No. PCT/CN2021/121046, mailed on Jun. 23, 2022. 7 pages with English translation.
Written Opinion of the International Search Authority in the international application No. PCT/CN2021/121046, mailed on Jun. 23, 2022. 6 pages with English translation.
Supplementary European Search Report in the European application No. 21958036.2, mailed on Apr. 30, 2025. 14 pages.

\* cited by examiner

300

```
┌─────────────────────────────────────────────────────────────┐
│ A prediction mode parameter of a current block is acquired, │
│ herein the prediction mode parameter indicates that an intra│──310
│ prediction value of the current block is determined by using│
│ a Template-based Intra Mode Derived (TIMD) mode             │
└─────────────────────────────────────────────────────────────┘
                              │
┌─────────────────────────────────────────────────────────────┐
│ A template of the current block is determined, herein the   │──320
│ template includes at least two sub-templates                │
└─────────────────────────────────────────────────────────────┘
                              │
┌─────────────────────────────────────────────────────────────┐
│ A weight of each of at least two prediction modes on a first│
│ unit is determined according to respective costs of the at  │──330
│ least two prediction modes on a first sub-template          │
└─────────────────────────────────────────────────────────────┘
                              │
┌─────────────────────────────────────────────────────────────┐
│ The intra prediction value of the current block is determined│
│ according to the respective weights of the at least two     │──340
│ prediction modes on the first unit                          │
└─────────────────────────────────────────────────────────────┘
```

FIG. 7

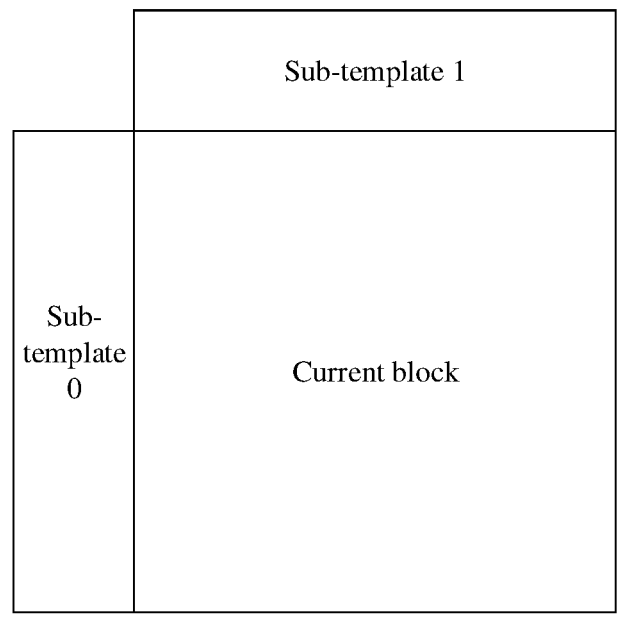

FIG. 8A

| Sub-block 0 | Sub-block 1 |
|---|---|
| Sub-block 2 | Sub-block 3 |

FIG. 9A

| Sub-block 0 | Sub-block 1 | Sub-block 2 | Sub-block 3 |
|---|---|---|---|
| Sub-block 4 | Sub-block 5 | Sub-block 6 | Sub-block 7 |
| Sub-block 8 | Sub-block 9 | Sub-block 10 | Sub-block 11 |
| Sub-block 12 | Sub-block 13 | Sub-block 14 | Sub-block 15 |

FIG. 9B

|  | Sub-template 1 ||
|---|---|---|
| Sub-template 0 | Sub-block 0 | Sub-block 1 |
|  | Sub-block 2 | Sub-block 3 |

FIG. 11A

|  | Sub-template 2 | Sub-template 3 |
|---|---|---|
| Sub-template 1 | Sub-block 0 | Sub-block 1 |
| Sub-template 0 | Sub-block 2 | Sub-block 3 |

FIG. 11B

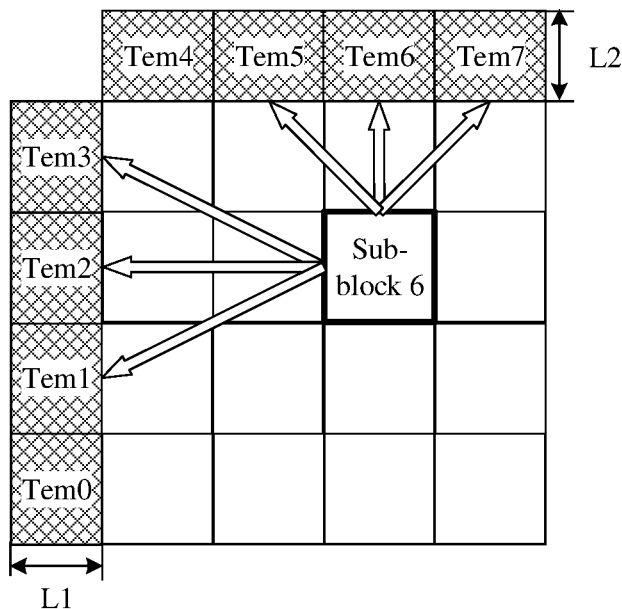

| A prediction mode parameter of a current block is acquired, herein the prediction mode parameter indicates that an intra prediction value of the current block is determined by using a Template-based Intra Mode Derived (TIMD) mode | ～410 |

| A first weight of each of at least two prediction modes on a first unit of the current block and a second weight of each of the at least two prediction modes on a second unit are determined | ～420 |

| A first change rate of each of the at least two prediction modes in the first direction is determined according to the first weight, the second weight, the coordinates of the first unit and the coordinates of the second unit | ～430 |

| A fourth weight of each of the at least two prediction modes on a fourth unit is determined according to the first change rate and the coordinates of the fourth unit | ～440 |

| The intra prediction value of the current block is determined according to the first weights, the second weights and the fourth weights | ～450 |

| A prediction mode parameter of a current block is acquired, herein the prediction mode parameter indicates that an intra prediction value of the current block is determined by using a Template-based Intra Mode Derived (TIMD) mode | ~510 |

| A template of the current block is determined, herein the template includes at least two sub-templates | ~520 |

| A prediction mode is determined according to costs of candidate modes on one or more of the at least two sub-templates | ~530 |

| The intra prediction value of the current block is determined according to the prediction mode | ~540 |

FIG. 14

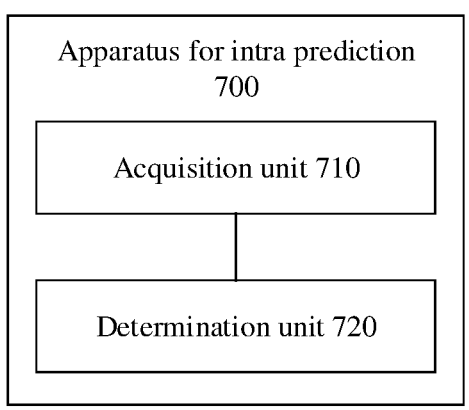

FIG. 15

METHOD FOR INTRA PREDICTION, ENCODER AND DECODER

CROSS-REFERENCE TO RELATED APPLICATION

This application is a continuation of International Application No. PCT/CN2021/121046 filed on Sep. 27, 2021, the disclosure of which is hereby incorporated by reference in its entirety.

TECHNICAL FIELD

Embodiments of the present disclosure relate to the field of video coding and decoding, and more particularly to a method for intra prediction, an encoder, a decoder and a coding and decoding system.

BACKGROUND

With the increasing of people's requirements for the video display quality, new forms of video applications such as high-definition and ultra-high-definition video have emerged. H.266/High Efficiency Video Coding (HEVC) is no longer able to meet the requirements of the rapid development of video applications. Joint Video Exploration Team (JVET) proposed the next generation video coding standard H.266/Versatile Video Coding (VVC).

In H.266/VVC, the Template-based Intra Mode Derivation (TIMD) manner uses the correlation between a template and a current block and utilizes the prediction effect of the intra prediction mode on the template to estimate the prediction effect on the current block, and finally selects one or two modes with the lowest cost as the prediction mode of the current block. However, the accuracy of the prediction effect of the TIMD manner needs to be further improved.

BRIEF DESCRIPTION OF THE DRAWINGS

FIG. 7 is a schematic flowchart of a method for intra prediction according to an embodiment of the present disclosure.

FIG. 8A is a specific example of a sub-template according to an embodiment of the present disclosure.

FIG. 9A is a specific example of a sub-block according to an embodiment of the present disclosure.

FIG. 9B is another specific example of a sub-block according to an embodiment of the present disclosure.

FIG. 11A is a specific example of a sub-template and sub-block according to an embodiment of the present disclosure.

FIG. 11B is another specific example of a sub-template and sub-block according to an embodiment of the present disclosure.

FIG. 11C is yet another specific example of a sub-template and sub-block according to an embodiment of the present disclosure.

FIG. 12 is a schematic flowchart of another method for intra prediction according to an embodiment of the present disclosure.

FIG. 14 is a schematic flowchart of another method for intra prediction according to an embodiment of the present disclosure.

FIG. 15 is a schematic block diagram of an apparatus for intra prediction according to an embodiment of the present disclosure.

DETAILED DESCRIPTION

The technical solutions in the embodiments of the present disclosure will be described below with reference to the drawings in the embodiment of the present disclosure.

The present disclosure is applicable to the field of video coding and decoding. First, the coding and decoding framework to which the embodiments of the present disclosure can be applied will be described with reference to FIG. 1 and FIG. 2. The coding and decoding framework is a block-based hybrid coding framework adopted by the current unified video coding and decoding standards.

Figure 1:
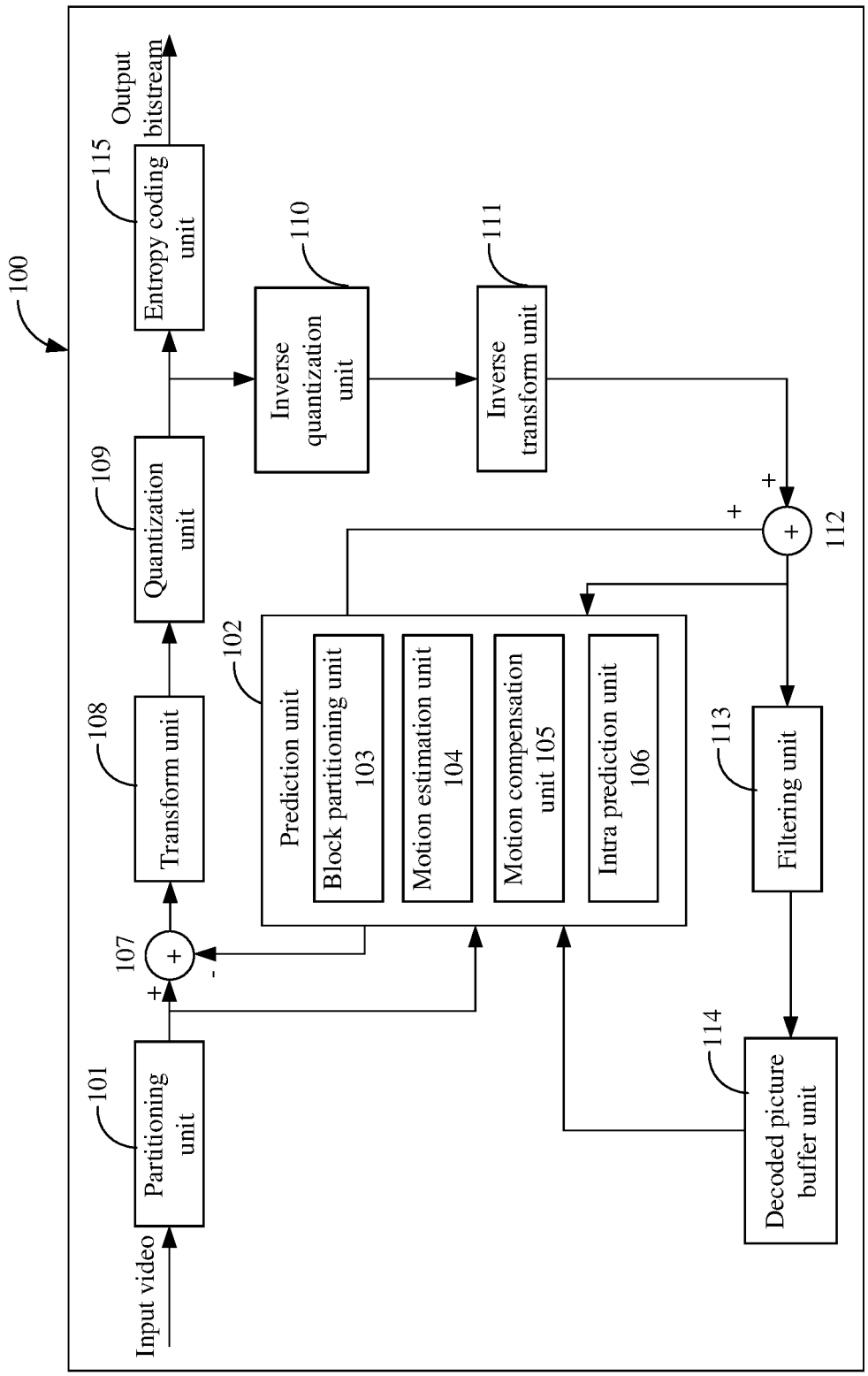
FIG. 1 is a schematic block diagram of an encoder according to an embodiment of the present disclosure.

FIG. 1 is a schematic block diagram of an encoder 100 according to an embodiment of the present disclosure. As illustrated in FIG. 1, the encoder 100 may include a partitioning unit 101, a prediction unit 102, a first adder 107, a transform unit 108, a quantization unit 109, an inverse quantization unit 110, an inverse transform unit 111, a second adder 112, a filtering unit 113, a Decoded Picture Buffer (DPB) Unit 114, and an entropy coding unit 115.

The partitioning unit 101 partitions a picture in the input video into one or more square Coding Tree Units (CTUs) or largest coding units (LCUs) of the same size. Exemplarily, the size of the CTU or LCU is 128×128, or 64×64 pixels. The partitioning unit 101 partitions the picture into a plurality of tiles and may further partition a tile into one or more bricks, herein one or more complete and/or partial CTUs or LCUs may be included in one tile or one brick. Moreover, the partitioning unit 101 may form one or more slices, and one slice may include one or more tiles of the picture arranged in grid order or one or more tiles covering the rectangular area in the picture. The partitioning unit 101 may also form one or more sub-pictures, and one sub-picture may include one or more slices, tiles or bricks.

In the encoder 100, the partitioning unit 101 transfers the CTU or LCU to the prediction unit 102. Generally, the prediction unit 102 may be composed of a block partitioning unit 103, a Motion Estimation (ME) unit 104, a Motion Compensation (MC) unit 105, and an intra prediction unit 106. The ME unit 104 and the MC unit 105 may constitute an inter prediction unit.

Specifically, the block partitioning unit 103 may further partition the input CTU or LCT into smaller Coding Units (CUs). CU may also be partitioned into Prediction Unit (PU) and so on, which is not limited herein.

The prediction unit 102 may use the ME unit 104 and the MC unit 105 to acquire the inter prediction block of the current block (e.g. CU or PU or the like). The intra prediction unit 106 may acquire the intra prediction block of the current block by using various intra prediction modes including a TIMD mode.

Due to the strong correlation between adjacent pixels in one frame of the video, the use of the method for intra prediction in video coding and decoding technology can help to eliminate spatial redundancy between adjacent pixels. Due to the strong similarity between adjacent frames in the video, the use of the method for inter prediction in video coding and decoding technology can help to eliminate the temporal redundancy between adjacent frames, thus improving the coding efficiency.

The prediction unit 102 outputs a prediction block of the current block, and the first adder 107 calculates a difference (i.e., a residual block) between the current block of the output of the partitioning unit 101 and the prediction block of the current block. The transform unit 108 reads the residual block and performs one or more transform operations on the residual block to acquire the coefficient. The quantization unit 109 quantizes the coefficient and outputs the quantized coefficient (i.e., level). The inverse quantization unit 110 performs a scaling operation on the quantized coefficient to output the reconstructed coefficient. The inverse transform unit 111 performs one or more inverse transforms corresponding to the transforms in the transform unit 108 and outputs the residual block. The second adder 112 calculates a reconstructed block by adding the residual block and the prediction block of the current block from the prediction unit 102. The second adder 112 further sends its output to the prediction unit 102 to be used as an intra prediction reference. After all blocks of the picture slice are reconstructed, the filtering unit 113 performs loop filtering on the reconstructed picture.

The output of the filtering unit 113 is the decoded picture. The decoded picture is buffered to the DPB unit 114. DPB 114 outputs a decoded picture according to timing and control information. Herein, the picture stored in the DPB 114 may also be used as a reference for the prediction unit 102 to perform the inter prediction or intra prediction. Finally, the entropy coding unit 115 writes parameters (for example, block partition information, prediction, transformation, quantization, entropy coding, loop filtering and other mode information or parameter information, etc.) from the encoder 100 which are necessary for decoding the picture into the bitstream, that is, the encoder 100 finally outputs the bitstream.

Further, the encoder 100 may include a processor and a memory including a computer program. When the processor reads and executes the computer program, the encoder 100 reads the input video and generates a corresponding bitstream. In addition, the Encoder 100 may also be a computing device having one or more chips. These units implemented as integrated circuit on the chip have similar connection and data exchange functions to the corresponding units in FIG. 1.

Figure 2:
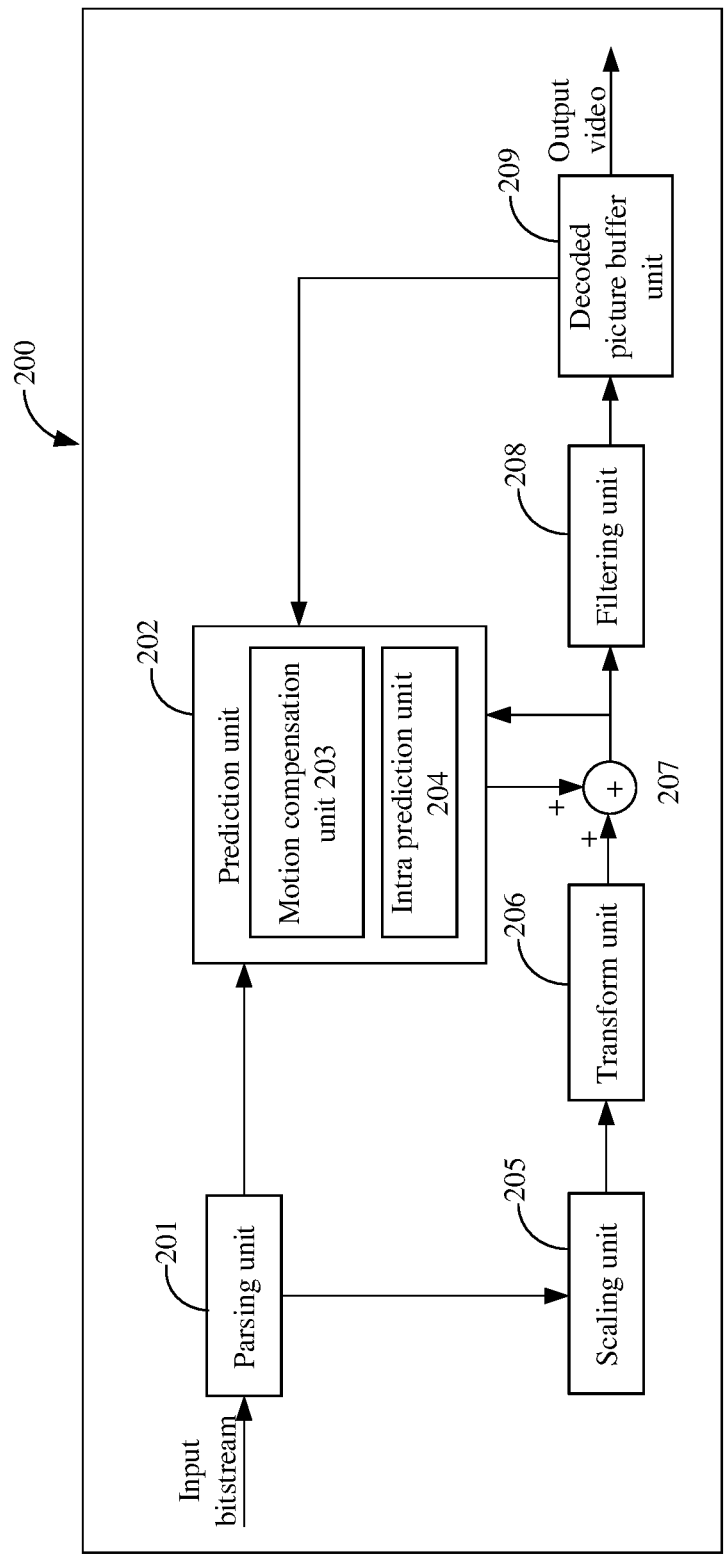
FIG. 2 is a schematic block diagram of a decoder according to an embodiment of the present disclosure.

FIG. 2 is a schematic block diagram of a decoder 200 according to an embodiment of the present disclosure. As illustrated in FIG. 2, the decoder 200 may include: a parsing unit 201, a prediction unit 202, a scaling unit 205, a transform unit 206, an adder 207, a filtering unit 208, and a decoded picture buffer unit 209.

The input bitstream of the decoder 200 may be the bitstream output by the encoder 100. The parsing unit 201 parses the input bitstream, for example, based on the existing information, and determines the block partition information, mode information (prediction, transformation, quantization, entropy coding, loop filtering, etc.) or parameter information that are the same as those of the encoding side, thereby ensuring that the reconstructed picture acquired by the encoding side is the same as the decoded picture acquired by the decoding side. The parsing unit 201 transmits the acquired mode information or parameter information to the unit of the decoder 200.

The prediction unit 202 determines a prediction block of the current decoded block (e.g. CU or PU, etc.). Herein, the prediction unit 202 may include a motion compensation unit 203 and an intra prediction unit 204. Specifically, when it is indicated that the inter decoding mode is used for decoding the current decoded block, the prediction unit 202 passes the relevant parameters from the parsing unit 201 to the motion compensation unit 203 to acquire the inter prediction block. When it is indicated that an intra prediction mode (including a TIMD mode based on a TIMD flag) is used for decoding the current decoded block, the prediction unit 202 transmits the relevant parameters from the parsing unit 201 to the intra prediction unit 204 to acquire the intra prediction block.

The scaling unit 205 has the same function as the inverse quantization unit 110 of the encoder 100. The scaling unit 205 performs a scaling operation on the quantization coefficient (i.e., level) from the parsing unit 201 to acquire reconstruction coefficient. The transform unit 206 has the same function as the inverse transform unit 111 of the encoder 100. The transform unit 206 performs one or more transform operations (i.e. an inverse operation of the one or more transform operations performed by the inverse transform unit 111 in the encoder 100) to acquire a residual block.

The adder 207 performs an addition operation on its inputs (the prediction block from the prediction unit 202 and the residual block from the transform unit 206) to acquire a reconstructed block of the current decoded block. The reconstructed block is also transmitted to the prediction unit 202 to be used as a reference for other blocks encoded in the intra prediction mode.

After all blocks of the picture are reconstructed, the filtering unit 208 performs loop filtering on the reconstructed picture. Herein, the output of the filtering unit 208 is the decoded picture, and the decoded picture is buffered to the DPB 209. DPB 209 outputs a decoded picture according to timing and control information. The picture stored in the DPB 209 may also be used as a reference for the inter prediction or intra prediction performed by the prediction unit 202.

Further, the decoder 200 may include a processor and a memory including a computer program. When the processor reads and executes the computer program, the decoder 200 reads the input bitstream and generates a corresponding decoded video. In addition, the decoder 200 may also be a computing device having one or more chips. These units implemented as integrated circuit on the chip have similar connection and data exchange functions to the corresponding units in FIG. 2.

It is to be understood that the basic flow of a video encoder and decoder under a block-based hybrid encoding framework has been described above in conjunction with FIG. 1 or FIG. 2, and the encoder and decoder framework or basic flow is only used to illustrate and is not intended to limit the embodiments of the present disclosure. For example, some modules or operations of the framework or process may be optimized as the technology evolves. In the specific implementation, the technical solution provided by the embodiments of the disclosure can be flexibly applied according to the actual requirements.

In the embodiments of the present disclosure, the current block refers to the current CU, or the current PU, or other coding block, which is not limited herein.

Figure 3:
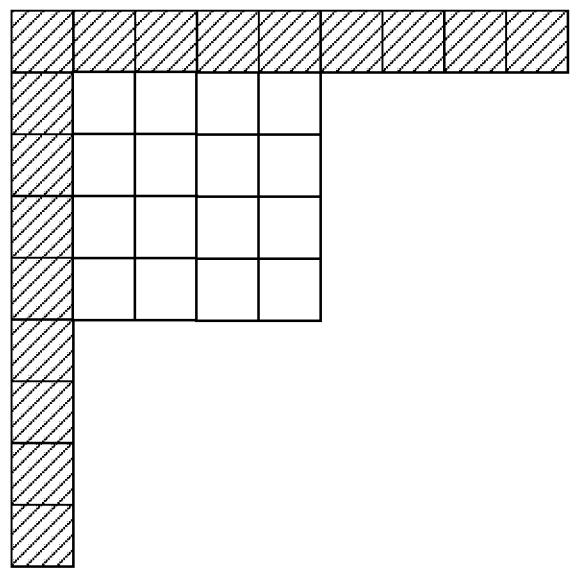
FIG. 3 is an example of predicting a current block by using reconstructed pixels as reference pixels.

Exemplarily, in the intra prediction unit 106 of the encoder 100 or the intra prediction unit 204 of the decoder 200, the current block may be predicted by using the reconstructed pixels (e.g. pixels of the reconstructed picture as described above) that have been encoded around the current block as the reference pixels. FIG. 3 illustrates an example of predicting a current block by using the reconstructed pixels as the reference pixels. As illustrated in FIG. 3, the white-filled 4×4 block is the current block, and the shadow-filled pixels in the left column and the upper row of the current block are the reference pixels for the current block. The intra prediction unit predicts the current block by using these reference pixels. In some embodiments, the reference pixels may already be all available, that is, all reference pixels have been encoded and decoded. In other embodiments, the reference pixels may be partially unavailable. For example, if the current block is at the leftmost of the entire frame, then the reference pixels at the left of the current block are unavailable. Alternatively, when the current block is encoded and decoded, the lower left part of the current block has not been encoded or decoded, then the lower left reference pixels are not available. In the case where the reference pixel is not available, the filling may be performed by using the available reference pixels or certain values or certain manners, or the filling may not be performed, which is not limited herein. In some embodiments, a Multiple Reference Line (MRL) intra prediction method may be utilized, i.e. using more reference pixels, to improve the coding efficiency.

There are multiple prediction modes for intra prediction. For example, in H.264, 9 modes (Mode 0 to Mode 8) can be used for intra prediction of 4×4 blocks. Mode 0 copies the pixels above the current block to the current block according to the numerical direction as the prediction value, Mode 1 copies the left reference pixels to the current block according to the horizontal direction as the prediction value, Mode 2 DC takes the average value of 8 points A~D and I~L as the prediction value for all points, and Modes 3~8 copy the reference pixels to the corresponding position of the current block according to a certain angle, respectively. Because some positions of the current block do not correspond exactly to the reference pixels, it may be necessary to use the weighted average of the reference pixels, or the sub-pixels of the interpolated reference pixels.

Figure 4:
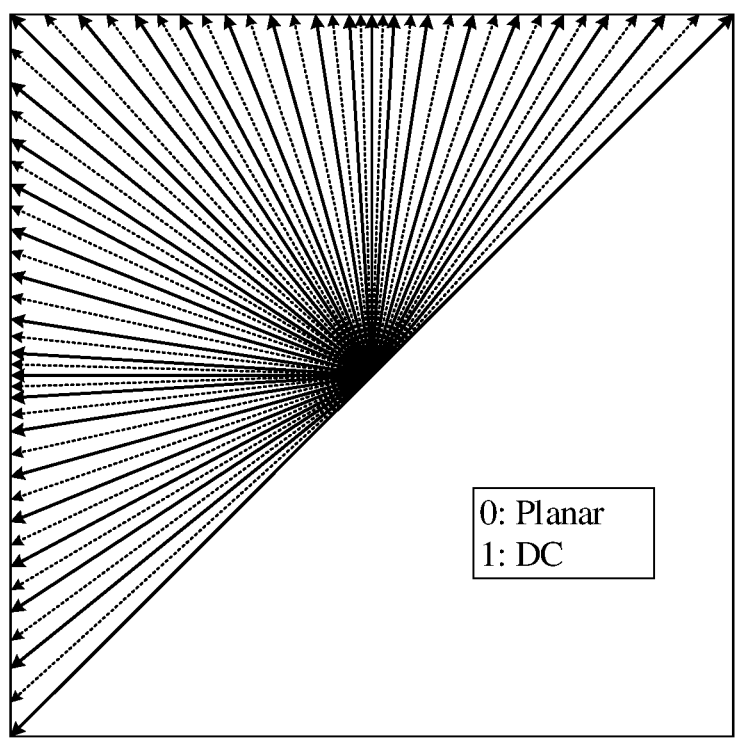
FIG. 4 is an example of an intra prediction mode.
Figure 5:
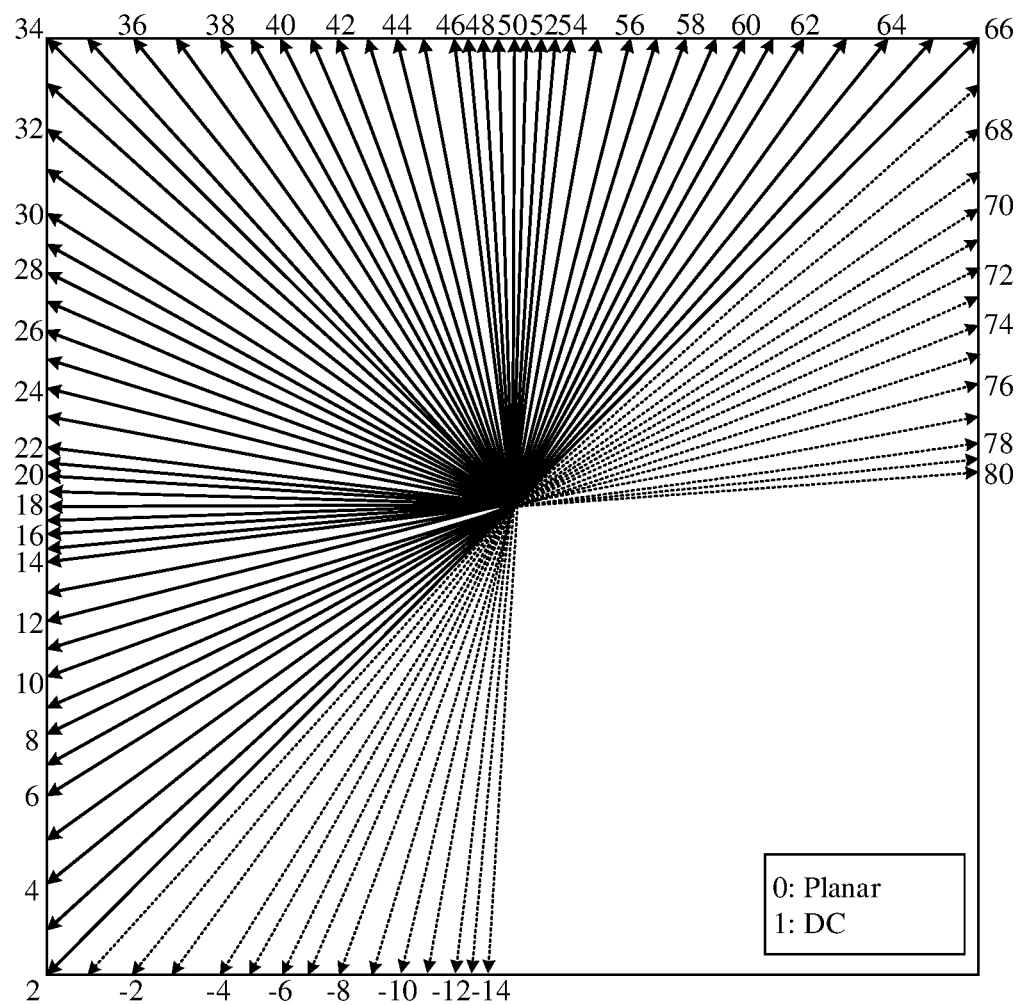
FIG. 5 is another example of an intra prediction mode.

In addition, there are other modes such as Plane and Planar, etc. With the development of technology and the expansion of blocks, there are more and more angular prediction modes. For example, the intra prediction modes used by HEVC include Planar, DC and 33 angular modes, for a total of 35 prediction modes. For another example, as illustrated in FIG. 4, VVC has 67 intra prediction modes, in which there are 65 angular prediction modes in addition to Mode 0 Planar and Mode 1 DC. Planar generally deals with gradient textures, DC generally deals with flat areas, and intra angular prediction is generally used for blocks with obvious angular texture. The angular prediction tiles the reference pixels to the current block at a specified angle as the prediction value. Certainly, a wide-angler prediction mode may also be used in VVC for non-square block, and the wide-angler prediction mode makes the predicted angle have a larger range than the angle of the square block. As illustrated in FIG. 5, 2~66 are angles corresponding to the prediction mode for the square block. −1~−14 and 67~80 represent the extended angles in the wide-angle prediction mode. It is to be understood that what we are talking about here is the prediction mode of a single component, such as the prediction mode of Y component alone. Because of the introduction of cross-component prediction in VVC, that is, by using the correlation between channels, U and V components can be predicted by using the reconstructed value of Y component in the same block, and these cross-component prediction modes are not included in the above-mentioned modes.

In some embodiments, the decoder may determine the intra prediction mode used by the current block based on some flag information. In order to reduce the overhead of these flag information in the bitstream, the Most Probable Mode (MPM) is introduced. The decoder can derive some MPM according to the correlation between blocks. Because MPM is more likely to be selected, it is generally possible to use the shorter code word to represent the description in MPM and the longer code word to represent non-MPM mode. MPM generally uses the mode used by adjacent block, such as the description used by the left adjacent block and the upper adjacent block. Because of the spatial correlation, the mode used by the adjacent block may also be used in the current block. In addition, these modes related to the modes of the adjacent blocks, such as modes with similar angles, such as subtle texture change between the current block and the adjacent block. There is also the most generally used mode, such as planar mode.

Figure 6:
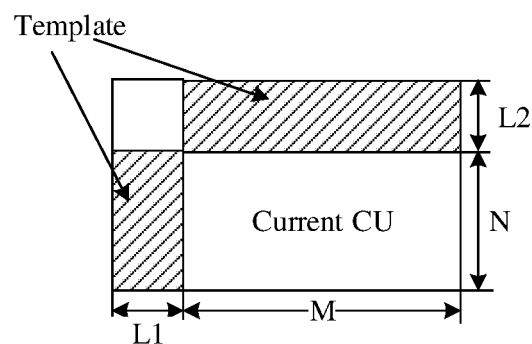
FIG. 6 is a schematic diagram of a current CU and templates of a TIMD manner.

In view of above, a TIMD manner is proposed. FIG. 6 illustrates a schematic diagram of a current CU and templates of a TIMD manner. As illustrated in FIG. 6, a template can be set at the left and upper adjacent to the current CU, and the region of the template has been decoded. For example, the size of the current CU is M*N, the size of the template on the left side of the current CU is L1*N, and the size of the template on the upper side of the current CU is M*L2. Because the template and the current CU are adjacent, there is a certain correlation. Therefore, the prediction effect of a certain intra prediction mode on the template can be used to estimate the prediction effect of the certain intra prediction mode on the current CU. In other words, if a prediction mode has a good prediction effect on the template, it is very likely that the prediction mode will have a good prediction effect on the current CU.

The TIMD may determine one or two prediction modes for performing intra prediction on the current block. For example, when two prediction modes are selected, the prediction values of the two prediction modes may be weighted according to a certain proportion (i.e., a weight) to acquire an intra prediction value of the current block. However, the current TIMD technology sets the same weight for each point of the current block. For the picture with complex texture, the prediction effects of two prediction modes for different positions in the current block may be different. For example, one mode has a good prediction effect for the left side of the current block, but a bad prediction effect for the right side of the current block, while the other mode has a good prediction effect for the right side of the current block, but a bad prediction effect for the left side of the current block. Therefore, a method is urgently needed to improve the accuracy of intra prediction.

In view of above, the embodiment of the present disclosure provides a method for intra prediction. The template of the current block is partitioned into sub-templates, the weights of at least two prediction modes on a unit (such as a sub-block, a portion or a pixel, etc.) of the current block are determined according to the sub-templates, and then the intra prediction value of the current block is determined according to the weights of at least two prediction modes on the unit of the current block. Since the respective weights of at least two prediction modes on different units of the current block may be determined in the embodiments of the disclosure, different weights may be set for different position points of the current block. Thus, the embodiments of the disclosure are helpful to more accurately determine the intra prediction value of the current block, thereby improving the compression efficiency.

FIG. 7 illustrates a schematic flowchart of a method 300 for intra prediction according to an embodiment of the present disclosure. The method 300 may be applied to an encoder, such as encoder 100 in FIG. 1, or to a decoder, such as decoder 200 in FIG. 2. Further, the method 300 may be applied to the intra prediction unit 106 in the encoder 100 or the intra prediction unit 204 in the decoder 200. As illustrated in FIG. 7, the method 300 includes operations 310 to 340.

At operation 310, a prediction mode parameter of a current block is acquired, herein the prediction mode parameter indicates that an intra prediction value of the current block is determined by using a TIMD mode.

In embodiments of the present disclosure, the current block may refer to a block currently being encoded or a coding block, such as a CU, a PU, or the like, which is not limited herein. The current block may also be replaced by "coding block", "block", "current coding block", etc., all of which can represent the same or similar meaning.

In some embodiments, when the method 300 is applied to the encoding side, the encoder may determine whether the current block uses the TIMD mode. Alternatively, the encoder may transmit in the bitstream the information (i.e., the prediction mode parameter) indicating whether the current block uses the TIMD mode. Exemplarily, the encoder may calculate the cost of using the TIMD mode, as well as the cost of other modes (e.g., selecting a certain MPM mode, selecting a certain non-MPM mode), and may determine that the current block uses the TIMD mode to determine the intra prediction value of the current block if the cost of the TIMD mode is minimal. Otherwise, it is determined that the current block does not use the TIMD mode to predict the intra prediction value of the current block.

In some other embodiments, when the method 300 is applied to the decoding side, and the decoder may determine whether the current block uses the TIMD mode. For example, the decoder may acquire the input bitstream, and acquire the information (i.e., the prediction mode parameter) indicating whether the current block uses the TIMD mode from the bitstream.

In the embodiments of the present disclosure, the prediction mode parameter indicates that the current block uses the TIMD mode, that is, the intra prediction value of the current block is determined by using the TIMD mode.

At operation 320, a template of the current block is determined, herein the template includes at least two sub-templates.

In an example, the template of the current block (also referred to as the entire template of the current block) may be determined, and then the template is partitioned into at least two sub-templates. For example, the entire template of the current block may be determined in the manner as described above in FIG. 6, or the template of the current block may be determined in other manners, for example, the left part, the upper part and the upper left part of the current block are all determined as the entire template of the current block, which is not limited herein.

As another example, at least two sub-templates may be directly determined as the template for the current block according to the position of the current block.

In some alternative embodiments, the at least two sub-templates include at least one of: a pixel block adjacent to a left side of the current block, a pixel block adjacent to an upper side of the current block, a pixel block at upper left of the current block, a pixel block at lower left of the current block, or a pixel block at upper right of the current block.

Figure 8B:
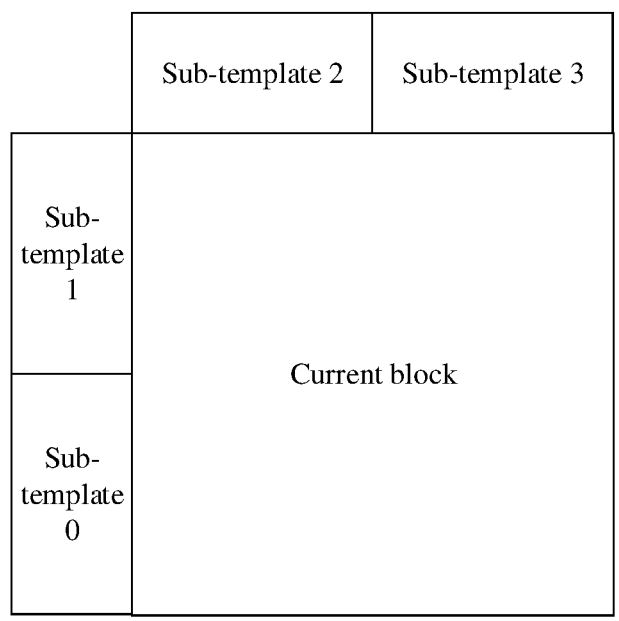
FIG. 8B is another specific example of a sub-template according to an embodiment of the present disclosure.

Exemplarily, the at least two sub-templates may belong to different parts of the template of the current block. As an example, the template of the current block may be determined according to the template illustrated in FIG. 6. Referring to FIG. 8A, the template can be divided into two parts, including sub-template 0 and sub-template 1, where the sub-template 0 includes adjacent pixels on the left side of the current block, and the sub-template 1 includes adjacent pixels on the upper side of the current block. In some examples, the sub-template left of the current block may be further partitioned, and/or the sub-template upper of the current block may be further partitioned. For example, in FIG. 8B, the template may include sub-template 0, sub-template 1, sub-template 2 and sub-template 3.

In addition, in the template illustrated in FIG. 6, only the part of the pixels adjacent to the left and upper of the current block are used as templates. However, the part of the pixel blocks at upper left, lower left and upper right of the current block may also have certain correlation with the current block, especially when the texture of the current block presents certain angles. Therefore, the part of the pixel blocks on the upper left, lower left or upper right of the current block may also be used as part of the template.

Figure 8C:
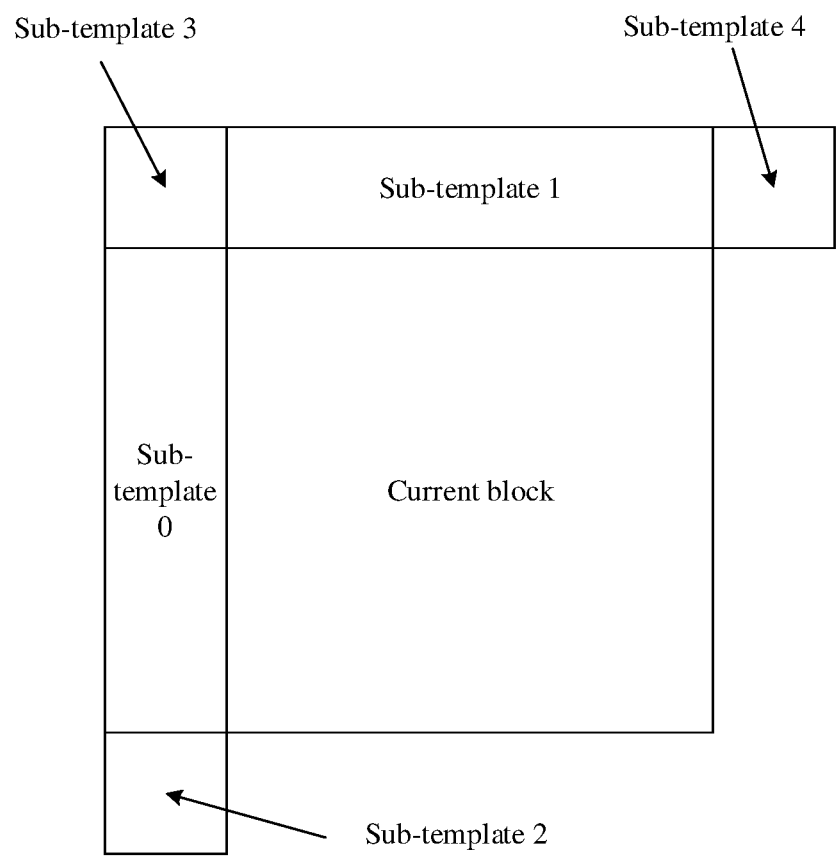
FIG. 8C is yet another specific example of a sub-template according to an embodiment of the present disclosure.
Figure 8D:
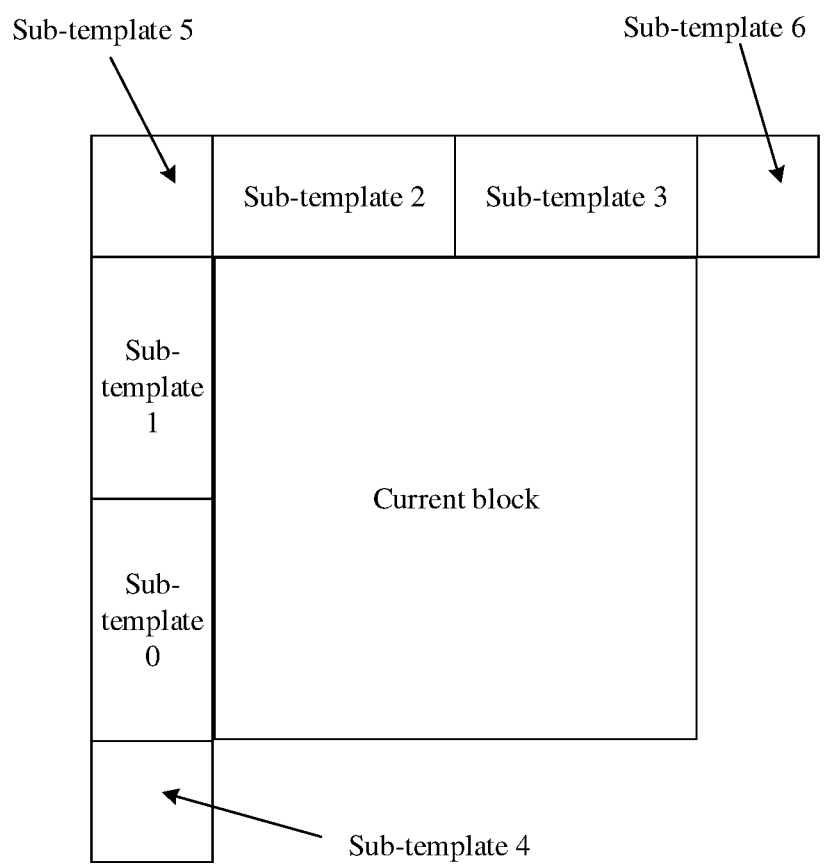
FIG. 8D is still another specific example of a sub-template according to an embodiment of the present disclosure.

With respect to the template in FIG. 8A, the template in FIG. 8C may further include a sub-template 2, a sub-template 3, and a sub-template 4. The sub-template 2 includes some pixels at the lower left of the current block, the sub-template 3 includes some pixels at the upper left of the current block, and the sub-template 4 includes some pixels at the upper right of the current block. With respect to the template in FIG. 8B, the template in FIG. 8D may further include a sub-template 4 at the lower left of the current block, a sub-template 5 at the upper left of the current block and a sub-template 6 at the upper right of the current block.

It is to be understood that the extension template in FIG. 8C may also be directly used in the existing TIMD manner, which is not limited in the present disclosure.

It is to be understood that FIG. 8A to FIG. 8D illustrate several specific examples of sub-templates provided by the present disclosure. However, this is not intended to limit the present disclosure. For example, the template may also include other coded or uncoded pixels. These pixels may or may not be adjacent to the current block, which is not limited herein.

In some alternative embodiments, the current block may be partitioned into at least two units. Exemplarily, the unit may be a sub-block, or a portion, or a pixel. The following describes an example of taking a unit as a sub-block.

Figure 16:
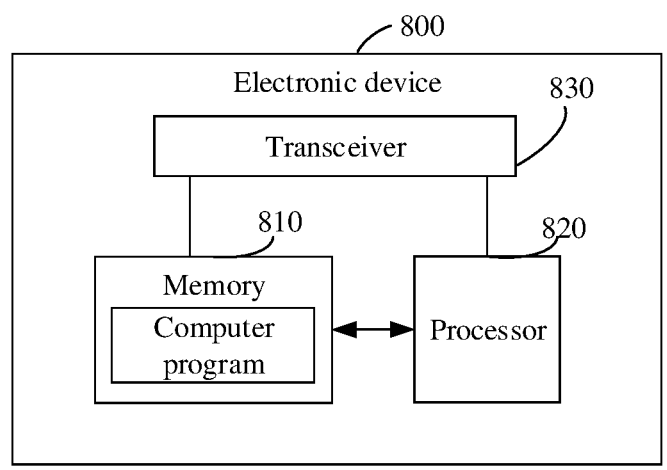
FIG. 16 is a schematic block diagram of an electronic device according to an embodiment of the present disclosure.

Exemplarily, assuming that the current block is square, the current block may be partitioned into 4 sub-blocks as illustrated in FIG. 9A or 16 sub-blocks as illustrated in FIG. 9B, which is not limited herein. As illustrated in FIG. 9A, the sub-block 0 includes the part of the pixels in the upper left corner of the current block, the sub-block 1 includes the part of the pixels in the upper right corner of the current block, the sub-block 2 includes the part of the pixels in the lower left corner of the current block, and the sub-block 3 includes the part of the pixels in the lower right corner of the current block. FIG. 9B is similar to FIG. 9A and will not be elaborated herein.

It is to be understood that FIG. 9A to FIG. 9B illustrate two specific examples of sub-blocks provided by the embodiments of the present disclosure. However, this does not constitute the limitation of the present disclosure. For example, the current block may also not be square, for example, the current block is rectangular, circular, trapezoidal or irregular shape, or the current block may also be partitioned into other number of sub-blocks, which is not limited herein.

In some embodiments, the current block is partitioned into a fixed number of portions regardless of the size of the current block. In other embodiments, the current block may be partitioned into different portions according to the size of the current block, for example, a smaller block (e.g., 32×32, 16×16, 4×4, etc.) may be partitioned into 4 portions and a larger block (e.g., 128×128, 64×64, 32×32, etc.) may be partitioned into 16 portions. In some other embodiments, the current block may be partitioned into different portions according to the texture complexity of the current block. For example, a block with simpler texture may be partitioned into 4 portions, and a block with more complex texture may be partitioned into 16 portions.

It is to be noted that in the embodiment of the present disclosure, the number of pixels in a unit (such as a sub-block, or a portion, or a pixel) may be one or more, which is not limited herein. In some embodiments when a unit includes one pixel, the operation of partitioning the current block into at least two units may not need to be performed.

At operation 330, a weight of each of at least two prediction modes on a first unit is determined according to respective costs of the at least two prediction modes on a first sub-template. In the case of partitioning the current block into at least one sub-block, the first unit may be, for example, a first sub-block, the at least two sub-blocks includes the first sub-block and the at least two sub-templates include the first sub-template. Hereafter the prediction mode may be referred to as mode for short.

In some alternative embodiments, the at least two prediction modes may be at least two modes, which are selected from the candidate modes, with the lowest cost on the entire template of the current block.

For example, several candidate modes may be tried on the entire template of the current block, respectively, and at least two modes with lowest cost are selected. The candidate modes may be the modes in the MPM list, or some modes derived from information of adjacent blocks, or some modes derived from other information, or all possible modes, which is not limited herein. In some embodiments, TIMD has expanded 67 intra prediction modes to 131 intra prediction modes, and the angle of angular prediction is finer.

As an example, the cost may be calculated according to the Sum of Absolute Transformed Difference (SATD). As a specific example, assume that mode 0 has the lowest cost on the entire template of the current block, the lowest cost may be denoted as costMode0, mode 1 has the second lowest cost on the entire template of the current block, the second lowest cost is denoted as costMode1, and so on. Alternatively, at least two (e.g., two, three, or other numbers) prediction modes with the lowest cost on the entire template of the current block may be used as the above-mentioned at least two prediction modes.

In some alternative embodiments, if the difference of the costs corresponding to the at least two prediction modes is not large, the prediction value of the current block may be determined by simultaneously using the at least two prediction modes. For example, the prediction values of the at least two prediction modes may be weighted according to a certain proportion. On the contrary, if the different of the costs corresponding to at least two prediction modes is large, the prediction value of the current block may be determined by using the prediction mode with less cost of the at least two prediction modes.

As a specific example, when mode 0 and mode 1 are the two modes with the lowest cost on the entire template of the current block, it may be determined whether the following statement is true:

$$costMode1 < 2 * costMode0$$

if it is true, a combination of mode 0 and mode 1 is used. Otherwise, only mode 0 is used.

In some alternative embodiments, the at least two prediction modes may be at least two modes, which are selected from the candidate modes, with the lowest cost on one or more of the sub-templates of the current block.

Specifically, the embodiments of the present disclosure supports partitioning the template of the current block into a plurality of portions (i.e., sub-templates), and the correlation of points close to each other in space is strong, while the correlation of points far from each other is weak. Here, the partition of the template into two sub-templates on the top and the left (i.e. in FIG. 8A) is illustrated as an example. For example, if some pixels are close to the upper sub-template and far from the left sub-template, then these points have strong correlation with the upper sub-template, that is, the intra prediction mode that performs well on the upper sub-template is more suitable for these pixels. However, some intra prediction modes perform well on the upper sub-template, and performs poorly on the left template, resulting in poor performance of these modes on the entire template, such that these modes may be abandoned in the prior art. However, in embodiments of the present disclosure, these intra prediction modes may be employed.

Exemplarily, some candidate modes may be tried on the sub-templates of the current block, respectively. For example, the mode with lowest cost on each sub-template is selected as the at least two prediction modes. The candidate mode or cost may refer to the above description and will not be elaborated here.

Figure 10:
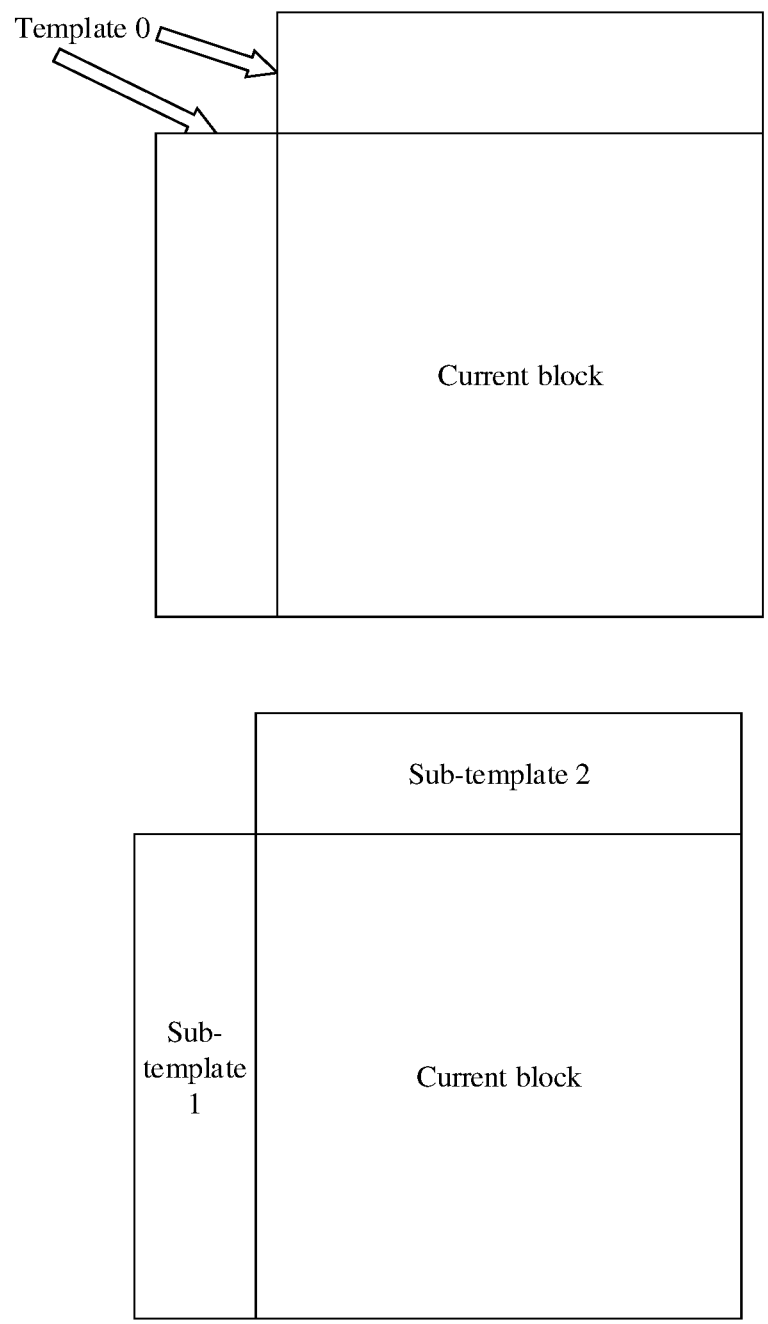
FIG. 10 is a specific example of a sub-template according to an embodiment of the present disclosure.

As a specific example, referring to FIG. 10, assuming that mode 0 has the lowest cost on the entire template (denoted as template 0) of the current block, this lowest cost may be denoted as costMode0, mode 1 has the lowest cost on the sub-template 1 of the current block, the lowest cost may be denoted as costMode1Tem1, and mode 2 has the lowest cost on the sub-template 2 of the current block, the lowest cost may be denoted as costMode2Tem2. Alternatively, three modes, i.e., mode 0 with the lowest cost on the entire template of the current block, mode 1 with the lowest cost on the sub-template 1, and mode 2 with the lowest cost on the sub-template 2, may be used as the above-mentioned at least two prediction modes. In this way, among the three selected modes, one mode (mode0) performs best on the entire, and the other two perform best locally, for example, mode 1 performs best on sub-template 1 and mode 2 performs best on sub-template 2.

In some alternative embodiments, a mode that performs well (i.e., with a low cost) on a local template may not necessarily perform well on the entire template, as such, further limitations may be set when selecting at least two prediction modes. For example, the cost of the at least two prediction modes on the entire template may not exceed a first value, herein the first value is a preset threshold, or the first value is an integer multiple (e.g., 2 times) of the cost of the mode (i.e. mode 0) with the lowest cost on the entire template (e.g. costMode0), or otherwise, which is not limited herein.

As a specific example, when mode 0, mode 1 and mode 2 are the modes with the lowest cost on the entire template, sub-template 1 and sub-template 2 of the current block, respectively, the cost of mode 1 or mode 2 on the entire template may be further set to not exceed 2 times of costMode0.

After determining the at least two modes, a weight of each of the at least two prediction modes on the first unit may be determined according to respective costs of the at least two prediction modes on the first sub-template. Exemplarily, the first sub-template may be one of the at least one sub-template determined in operation 320, and the first sub-block may be one of the at least one sub-block determined above. That is, the weights of the at least two prediction modes on different positions of the current block may be calculated according to the costs of the at least two prediction modes on the different sub-templates of the template.

In some alternative embodiments, the first sub-template includes a sub-template, which is closest to the first sub-block, of at least two sub-templates. For example, the first sub-template may be adjacent to the first sub-block. That is, in the embodiments of the present disclosure, according to the prediction effects of the at least two prediction modes on different sub-templates of the template, the prediction effect of each of the at least two prediction modes on the corresponding adjacent portion of the current block may be estimated.

With reference to FIG. 11A to FIG. 11C, taking the selection of the two modes with the lowest cost on the entire template of the current block as an example, a process of determining the weight of each of at least two prediction modes on the first sub-block according to the respective costs of the at least two prediction modes on the first sub-template is described below. It is to be understood that the embodiments of the present disclosure may be extended to the case of combination of more modes. When more than two modes are selected, the weight of each mode on the sub-block may be determined based on the same or similar manner as two modes, and will not be elaborated here.

As a specific example, referring to FIG. 11A, the sub-templates are for example the two sub-templates in FIG. 8A, and the sub-blocks are for example the sub-blocks in FIG. 9A. Taking FIG. 9A as an example, the distance between sub-block 0 and sub-template 0 and the distance between sub-block 0 and sub-template 1 may be considered to be the same, and the distance between sub-block 3 and sub-template 0 and the distance between sub-block 3 and sub-template 1 may be considered to be the same. However, the distance between sub-block 1 and sub-template 1 is closer than the distance between sub-block 1 and sub-template 0, and the distance between sub-block 2 and sub-template 0 is closer than the distance between sub-block 2 and sub-template 1. Thus, sub-block 1 may provide greater weight to the mode that performs better in sub-template 1, and sub-block 2 may provide greater weight to the mode that performs better in sub-template 0. Here, the good performance of a mode in a sub-template may be understood that the cost of the mode in the sub-template is low, and the poor performance may be understood that the cost of the mode on the sub-template is high.

As an example, the above-mentioned mode with the lowest cost on the entire template of the current block is denoted as mode 0, and its cost on the entire template is costMode0, its cost on sub-template 0 is costMode0Tem0, and its cost on sub-template 1 is costMode0tem1. The mode with the second lowest cost on the entire template of the current block is denoted as mode 1, and its cost on the entire template is costMode1, its cost on the sub-template 0 is costMode1Tem0, and its cost on the sub-template 1 is costMode1Tem1.

Exemplarily, for sub-block 1 (an example for the first sub-block described above), in the case of using a combination of two modes (i.e., mode 0 and mode 1), the weight of each mode is calculated as shown by the following formulas (1) and (2):

$$weight0Part1 = \frac{costMode1Tem1}{costMode0Tem1 + costMode1Tem1} \quad (1)$$

$$weight1Part1 = 1 - weight0Part1 \quad (2)$$

where weight0Part1 is the weight of mode 0 on sub-block 1, and weight1Part1 is the weight of mode 1 on sub-block 1.

Similarly, for sub-block 2 (another example for the first sub-block described above), in the case of using a combination of two modes (i.e., such as mode 0 and mode 1), the weight of each mode is calculated as shown by the following formulas (3) and (4):

$$weight0Part2 = \frac{costMode1Tem0}{costMode0Tem0 + costMode1Tem0} \quad (3)$$

$$weight1Part2 = 1 - weight0Part2 \quad (4)$$

where weight0Part2 is the weight of mode 0 on sub-block 2, and weight1Part2 is the weight of mode 1 on sub-block 2.

As can be seen, since the sub-block 1 is closer to the sub-template 1, the weights of the two modes, mode 0 and mode 1, on sub-block 1 are determined according to the performances of the two modes on sub-template 1, and since the sub-block 2 is closer to sub-template 0, the weights of the two modes, mode 0 and mode 1, on sub-block 2 are determined according to the performances of the two modes on sub-template 0.

In some alternative embodiments, the weight of each of the at least two prediction modes on the second sub-block may also be determined according to the respective costs of the at least two prediction modes on the template (i.e., the entire template of the current block). Herein, the second sub-block is a specific example of the second unit, and the above-mentioned at least two sub-blocks include the second sub-block. As an example, the distances between the second sub-block and at least two sub-templates are the same (or approximately the same).

For example, for sub-block 0 and sub-block 3 in FIG. 11A (a specific example for the second sub-block described above), since the distance between sub-block 0 and sub-template 0 and the distance between sub-block 0 and sub-template 1 may be considered the same, and the distance between sub-block 3 and sub-template 0 and the distance between sub-block 3 and sub-template 1 may be considered the same, the weight of each of the at least two prediction modes on sub-block 0 and sub-block 3 may be determined according to the respective costs of mode 0 and mode 1 on the entire template (i.e., the sum of sub-template 0 and sub-template 1). Herein, mode 0 and mode 1 have the same weight on sub-block 0 and sub-block 3.

In some alternative embodiments, the weight of each of the at least two prediction modes on the first unit may be determined according to the respective costs of the above-mentioned at least two prediction modes on the first sub-template and respective costs of the at least two prediction modes on the second sub-template, herein the at least two sub-templates include the second sub-template.

Exemplarily, the distance between the first sub-template and the first sub-block may be less than the distance between the second sub-template and the first sub-block. At this case, the costs of the at least two prediction modes on the first sub-template have a greater impact on the weights than the costs of the at least two prediction modes on the second sub-template. That is, the smaller the distance between the sub-template and the sub-block, the greater the impact of the cost of the prediction mode on the sub-template for the weight of the prediction mode on the sub-block.

Continuing with the above example in FIG. 11A, the weights of the two modes, mode 0 and mode 1, on sub-block 1 may also consider the performances of the two modes on sub-template 0, but the two modes have a greater impact on sub-template 1. The weights of mode 0 and mode 1 on sub-block 2 may also consider the performances of the two modes on sub-template 1, but the two modes have a greater impact on sub-template 0.

Exemplarily, for sub-block 1 (an example for the first sub-block described above), in the case of using a combination of two modes (i.e., such as mode 0 and mode 1), the weight of each mode is calculated as shown by the following formulas (5) and (6):

$$weight0Part1 = \frac{3*costMode1Tem1 + costMode1Tem0}{3*(costMode0Tem1 + costMode1Tem1) + costMode0Term0 + costMode1Term0} \quad (5)$$

$$weight1Part2 = 1 - weight0Part2 \quad (6)$$

where weight0Part1 is the weight of mode 0 on sub-block 1, and weight1Part1 is the weight of mode 1 on sub-block 1.

Similarity, for sub-block 2 (another example for the first sub-block described above), in the case of using a combination of two modes (i.e., such as mode 0 and mode 1), the weight of each mode is calculated as shown by the following formulas (7) and (8):

$$weight0Part2 = \frac{3*costMode1Tem0 + costMode1Tem1}{3*(costMode0Tem0 + costMode1Tem0) + costMode0Tem1 + costMode1Tem1} \quad (7)$$

-continued $$weight1Part2 = 1 - weight0Part2 \quad (8)$$

where weight0Part2 is the weight of mode 0 on sub-block 2, and weight1Part2 is the weight of mode 1 on sub-block 2.

That is, in the above example, the costs of the two sub-templates are weighted by using a weight of 1:3, or 3:1.

In some alternative embodiments, the weight of each of the at least two prediction modes on the first sub-block may also be determined according to the respective costs of the at least two prediction modes on the first sub-template and the respective costs of the at least two prediction modes on the template (i.e., the entire template of the current block).

Continuing with the above example in FIG. 11A, the weights of the two modes, mode 0 and mode 1, on sub-block 1 may also consider the performances of the two modes on the entire template of the current block. Optionally, the impact of the two modes on the sub-template may be greater than the impact of the two modes on the entire template, or less than the impact of the two modes on the entire template, which is not limited herein.

Exemplarily, for sub-block 1, in the case of using a combination of two modes (i.e., such as mode 0 and mode 1), the weight of each mode is calculated as shown by the following formulas (9) and (10):

$$weight0Part1 = \frac{3*costMode1Tem1 + costMode1}{3*(costMode0Tem1 + costMode1Tem1) + costMode0 + costMode1} \quad (9)$$

$$weight1Part1 = 1 - weight0Part1 \quad (10)$$

Similarly, the weights of mode 0 and mode 1 on sub-block 2 may refer to the calculation process of mode 0 and mode 1 on sub-block 1, and the weights of mode 0 and mode 1 on sub-block 0 and sub-block 3 may refer to the calculation process of the weights of mode 0 and mode 1 on sub-block 0 and sub-block 3 in FIG. 11A, which will not be elaborated herein.

That is, in the above example, the costs of the sub-template 1 and the entire template are weighted by using a weight of 1:3, or 3:1.

In some alternative embodiments, the template of the current block may be partitioned into more sub-templates, such as 4 sub-templates, or 16 sub-templates, so that the performance of a mode on a finer-grained template may be acquired, such that the calculation of weights is enabled to refer to more information, thereby contributing to a finer determination of the weights of each mode on each sub-block.

In some alternative embodiments, the current block may be divided into more sub-blocks, such as 16 sub-blocks, 32 sub-blocks, etc., so that the current block may be divided into a finer-grained sub-blocks, and then the weights of the finer-grained sub-blocks may be calculated, thus contributing to finer determination of the weights of each mode on each sub-block.

As a specific example, referring to FIG. 11B, the sub-templates are for example the four sub-templates in FIG. 8B, and the sub-blocks are for example the sub-blocks in FIG. 9A. Similar to FIG. 11A, the distances between sub-block 0 and the sub-templates may be considered the same and the distances between sub-block 3 and the sub-templates may be considered the same, and the weight of each of the at least two prediction modes on sub-block 0 and sub-block 3 may be determined according to the respective costs of the at least two prediction modes on the template (i.e. the entire template of the current block). For sub-block 1 and sub-block 2, the weight of each of the at least two prediction modes on the first unit is determined according to the respective costs of the at least two prediction modes on the sub-templates 0~3.

As an example, the mode with the lowest cost on the entire template of the current block is mode 0, and its cost on the entire template is costMode0, its cost on template X is costMode0TemX, where X is 0, 1, 2, 3. The mode with the second lowest cost on the entire template of the current block is mode 1, and its cost on the entire template is costMode1, its cost on the template X is costMode1TemX.

Exemplarily, for sub-block 1, in the case of using a combination of two modes (i.e., mode 0 and mode 1), the weight of each mode is calculated as shown by the following formulas (11) and (12):

$$weight0Part1 = \frac{A}{B} \quad (11)$$

where $$A = 4 * costMode1Tem3 +$$
$$3 * costMode1Tem2 + 2 * costMode1Tem1 + costMode1Tem0$$
$$B = 4 * (costMode0Tem3 + costMode1Tem3) +$$
$$3 * (costMode0Tem2 + costMode1Tem2) +$$
$$2 * (costMode0Tem1 + costMode1Tem1) +$$
$$(costMode0Tem0 + costMode1Tem0)$$

$$weight1Part1 = 1 - weight0Part1 \quad (12)$$

Similarly, the weights of mode 0 and mode 1 on sub-block 2 may refer to the calculation process of mode 0 and mode 1 on sub-block 1, and the weights of mode 0 and mode 1 on sub-block 0 and sub-block 3 may refer to the calculation process of the weights of mode 0 and mode 1 on sub-block 0 and sub-block 3 in FIG. 11A, which will not be elaborated herein.

It is to be understood that in the embodiment of the present disclosure, the maximum value of the calculated weight cannot exceed 1. If the calculated weight is greater than 1, the weight value should be clipped to 1.

As another specific example, referring to FIG. 11C, the partitions of the sub-template and the current block are more finely. For example, the current block is partitioned into several sub-blocks according to the size of 4×4, accordingly, the left template is partitioned into sub-templates according to the size of L1*4, and the upper template is also partitioned into sub-templates according to the size of 4*L2. For example, in FIG. 11C, the current block is a 16×16 blocks, and the current block may be partitioned into 16 sub-blocks according to the size of 4×4, and the templates are accordingly partitioned into 8 sub-templates, such as Tem0 to Tem7 in the figure.

As an example, when the weight of the prediction mode is calculated for the sub-block in FIG. 11C, the nearest one or more sub-templates in the horizontal and vertical directions corresponding to the current sub-block may be used. For example, for sub-block 6 in FIG. 11C, three sub-templates (such as Tem1, Tem2, and Tem3) closest to the sub-block 6 in the horizontal direction may be used, and three sub-templates (such as Tem5, Tem6, and Tem7) closest to the sub-block 6 in the vertical direction. Specifically, the manner of calculating the weights of at least two patterns on each sub-block may refer to the above description, and will not be elaborated here.

In some alternative embodiments, when the cost of a prediction mode on a first sub-template of the current block is minimal, the weight of the prediction mode at a sub-block or point closer to the first sub-template may be set to be greater, and the weight farther from the first sub-template may be set to be smaller, even to zero. For example, referring to FIG. 10, for the case that the mode performs best on the entire template, mode 1 performs best on sub-template 1, and mode 2 performs best on sub-template 2, the weights of mode 2 on the top to bottom of the current block may be set from large to small, and the weights of mode 1 on the left to right of the current block may be set to be from large to small. For example, in the case that the current block is partitioned into four sub-blocks, the weights of mode 2 on the upper two sub-blocks (e.g., sub-block 0 and sub-block 1) are not 0, the weights of mode 2 on the lower two sub-blocks (e.g., sub-block 2 and sub-block 3) are 0, the weights of mode 1 on the left two sub-blocks (sub-block 0 and sub-block 2) are not 0, and the weights of mode 1 on the right two sub-blocks (e.g., sub-block 1 and sub-block 3) are 0.

It is to be understood that if the cost of a mode on the sub-template is too high, the weight of the mode on the sub-template may be set to 0. For example, it may be determined that the cost of mode 1 on sub-template 1 is excessive when the cost of mode 1 on sub-template 1 is greater than 2 times the cost of mode 0 on sub-template 1.

At operation 340, the intra prediction value of the current block is determined according to the respective weights of the at least two prediction modes on the first unit.

For example, taking the first unit being the first sub-block as an example, when the first pixel is located in a sub-block N (an example of the first sub-block) of the current block, the intra prediction value of the first pixel may be the sum of the products of the intra prediction value of each mode at the first position and the weight of the mode in the sub-block N. N is an integer greater than or equal to 0, for example, for the case that the current block is partitioned into four sub-blocks, N=0, 1, 2, 3.

As a specific example, the above-mentioned first pixel may be denoted as (x, y), and for the case where at least two prediction modes are mode 0 and mode 1, it may be assumed that the prediction value of mode 0 at the position (x, y) is pred0XY, and the prediction value of mode 1 at the position (x, y) is pred1XY. Then the prediction value predXY at (x, y) may be expressed as the following formula (13):

$$predXY = pred0XY * weight0PartN + pred1XY * weight1PartN \quad (13)$$

When the weight of each of the at least two prediction modes on the second unit is determined according to the respective costs of the at least two prediction modes on the template, operation 340 may specifically include: the intra prediction value of the current block is determined according to the respective weights of the at least two prediction modes on the first unit and the respective weights of the at least two prediction modes on the second unit.

Specifically, taking the unit including sub-blocks as an example, the manner of determining the intra prediction value at position in sub-block N may refer to the above description. For the second pixel on the sub-block M (an example of the second sub-block), the prediction value may be the sum of the products of the prediction value of each mode at the second pixel and the weight of the mode in the sub-block M. M is an integer greater than or equal to 0, and N is not equal to M. Similarly, it may be referring to the above description of formula (13). Different from the process of determining the prediction value of the first pixel, the weights of the prediction modes on the second pixel are determined in a manner different from the weights of the prediction modes on the first pixel.

In some embodiments, such as in actual implementation, in order to avoid the use of decimals, the manner of first amplifying and then normalizing may be used. For example, the weights may be enlarged by 8 times. In order to achieve the effect similar to rounding, an offset value may be added, and the final prediction value may be shifted to the right by 3 bits.

Therefore, in the embodiments of the present disclosure, at least two sub-templates of the current block are determined, thus the weight of each of the at least two prediction modes on the first unit of the current block is determined according to the respective costs of the at least two prediction modes on the sub-templates, and then the prediction value of the current block is determined according to the weights. In the embodiments of the disclosure, since the weights of at least two prediction modes on different units of the current block may be determined, different weights may be set for different points in the current block. Thus, it is helpful to more accurately determine the intra prediction value of the current block, thereby improving the compression efficiency.

It is to be noted that in the embodiment of the present disclosure, the first unit and the second unit may be different pixels in the current block, or the pixels in different sub-blocks of the current block, or pixels in different portions of the current block, which is not limited herein. That is, in the embodiments of the present disclosure, the weight may be calculated in unit of points (i.e., pixel), sub-blocks or portions, which is not limited herein. In other words, in embodiments of the present disclosure, the granularity of calculating the weight may be point-by-point or sub-block or portion-by-portion, which is not limited herein.

For example, by calculating the weights of the prediction modes on each unit (e.g., sub-block, portion, or pixel) for the current block, it is possible to give more weight to a mode with better performance and less weight to a mode with poor performance on the unit as much as possible. That is, a greater weight is provided for the position (e.g. sub-block, portion, or pixel) on which the prediction effect of the mode is good, while a less weight is provided for the position on which the prediction effect of the mode is poor. As such, it is more reasonable than the method of unifying the weights on the entire current block, so that a prediction block with more complex texture can be produced.

The method of the embodiment of the present disclosure may be applied to the scenes with complex textures, such as the scenes with distorted lines, uneven surfaces, etc. That is, in these scenes with more complex textures, in the embodiments of the present disclosure, instead of encoding more residuals or partitioning smaller blocks to make the texture in a single block simple, the intra prediction is performed directly, so that the embodiments of the present disclosure can help to perform complex prediction by using as few flag bits as possible, thereby improving the compression efficiency.

In some alternative embodiments, after the intra prediction is performed according to the above-described method 300, the weights of the above-mentioned at least two prediction modes on the junction locations between the units (e.g. sub-blocks, portions, pixels, etc.) of the current block are different, which may result in that a boundary occurs at the junction locations of some units for the prediction block of the current block. As a possible processing method, a smoothing filtering process, such as an operation similar to de-blocking filtering, may be performed after the prediction values of the modes are weighted according to the weights. As another possible processing method, certain algorithms can be used to ensure that the weights between adjacent portions do not change too much. As another possible processing method, the current block can be partitioned into finer granularity in the process of calculating the weights of each mode in each portion, for example, a weight is calculated for each of the 4×4 sub-blocks, or a weight is calculated for each pixel, so as to ensure that the weights between adjacent units do not change too much.

Optionally, when the current block is partitioned into finer granularity, more sub-templates can be partitioned to better match the granularity of weight calculation. For example, referring to the example illustrated in FIG. 11B, the current block may be partitioned into two blocks in the horizontal direction and two blocks in the vertical direction, i.e., four sub-blocks in total. Accordingly, the template on the left may also be partitioned into two blocks, sub-template 0 and sub-template 1 as shown in the figure, and the upper template may also be partitioned into two blocks, sub-template 2 and sub-template 3 as shown in the figure. As such, the performance of a certain mode on a finer-grained template can be acquired, and more information can be referred to for weight calculation.

Meanwhile, the embodiment of the present disclosure also provides a method for intra prediction. After determining the weights of at least two prediction modes on at least two units (e.g. sub-blocks, portions, or pixels, etc.) of the current block, the change rate of the weights on the first direction (e.g. vertical direction or horizontal direction) can be further determined according to the weights of the at least two units. The weights on other units of the current block may be determined according to the change rate in a smooth transition manner to determine the intra prediction value of the current block. In the embodiments of the disclosure, since the weights of at least two prediction modes on different units of the current block may be determined, different weights may be set for different positions in the current block. Thus, the embodiments of the disclosure are helpful to more accurately determine the intra prediction value of the current block, thereby improving the compression efficiency.

FIG. 12 illustrates a schematic flowchart of another method 400 for intra prediction according to an embodiment of the present disclosure. The method 400 may be applied to an encoder, such as encoder 100 in FIG. 1, or to a decoder, such as decoder 200 in FIG. 2. Further, the method 400 may be applied to the intra prediction unit 106 in the encoder 100 or the intra prediction unit 204 in the decoder 200. As illustrated in FIG. 12, the method 400 includes operations 410 to 450.

At operation 410, a prediction mode parameter of a current block is acquired, herein the prediction mode parameter indicates that an intra prediction value of the current block is determined by using a TIMD mode.

More specifically, operation 410 may refer to the description of operation 310 of the method 300 and will not be elaborated.

At operation 420, a first weight of each of at least two prediction modes on a first unit of the current block and a second weight of each of the at least two prediction modes on a second unit are determined. Herein the coordinates of the first unit and the second unit are different in a first direction.

In some alternative embodiments, the above-mentioned at least two prediction modes are determined based on the costs of the candidate modes on the template of the current block (i.e. the entire template), and/or on the costs of the candidate modes on one or more of sub-templates of the template.

Optionally, in a case that the at least two prediction modes are determined according to the costs of the candidate modes on one or more of the at least two sub-templates, the respective costs of the at least two prediction modes on the template do not exceed a first value. The first value is a preset threshold or twice of the cost of the first prediction mode, and the first prediction mode is a minimum mode on the template.

Exemplarily, the at least two prediction modes may include two prediction modes, or three prediction modes, or more, which is not limited herein. Specifically, the manner of determining the prediction mode may refer to the description of step 340 in FIG. 7 and will not be elaborated here.

For example, the first unit and the second unit may be different pixels in the current block, or the pixels in different sub-blocks of the current block, or pixels in different portions of the current block, which is not limited herein. Optionally, when the first unit and the second unit are different portions or pixels in different sub-blocks, the method 400 further includes partitioning the current block into at least two sub-blocks or at least two portions. That is, in the embodiments of the present disclosure, the weight may be calculated in a unit of point (i.e., pixel), in a unit of sub-block or in a unit of portion, which is not limited herein. In other words, in embodiments of the present disclosure, the granularity of weight change may be in a unit of point, or in a unit of sub-block, or in a unit of portion, which is not limited herein.

In some embodiments, a first weight of each of the current block on a first unit and a second weight of each of the at least two prediction modes on a second unit may be determined in accordance with the method 300. The specific method may refer to the description of method 300, and will not be elaborated. In some other embodiments, the weights of the first and second units of the current block may also be determined according to other methods, which is not limited in the present disclosure.

In some alternative embodiments, the method 400 may further include: a third weight of each of the at least two prediction modes on a third unit of the current block is determined, herein the first unit and the third unit have different coordinates in the second direction, and the second direction is perpendicular to the first direction.

For example, the third unit may be a pixel different from the first unit and the second unit in the current block, or a pixel in a different sub-block than the first unit and the second unit, or a pixel in a different portion than the first unit and the second unit, which is not limited.

For example, the first direction may be a vertical direction and the second direction is a horizontal direction, which is not limited.

Specifically, the third weight of each of the at least two prediction modes on a third unit of the current block may be determined according to the method 300 or otherwise, which is not limited.

Figure 13A:
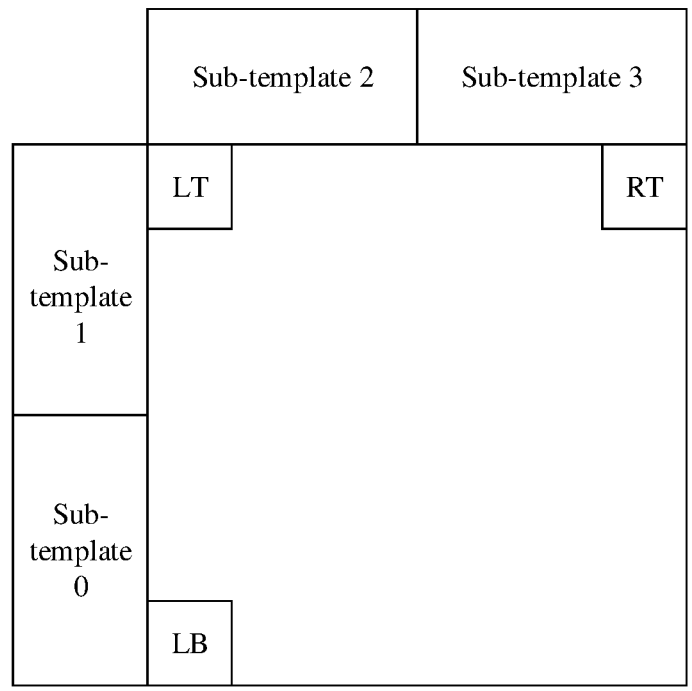
FIG. 13A is a specific example of three units of a current block according to an embodiment of the present disclosure.

In some alternative embodiments, the first unit may be at the upper left corner position of the current block, the second unit may be at the lower left corner position of the current block, and the third unit may be at the upper right corner position of the current block. Referring to FIG. 13A, as an example, the size of the current block is M×N, then the first cell may be at an upper left corner position (denoted as LT), the coordinates may be denoted as (0, 0), the second cell may be at a lower left corner position (denoted as LB), the coordinates may be denoted as (0, N−1), the third cell may be at an upper right corner position (denoted as RT), and the coordinates may be denoted as M−1, 0).

Figure 13B:
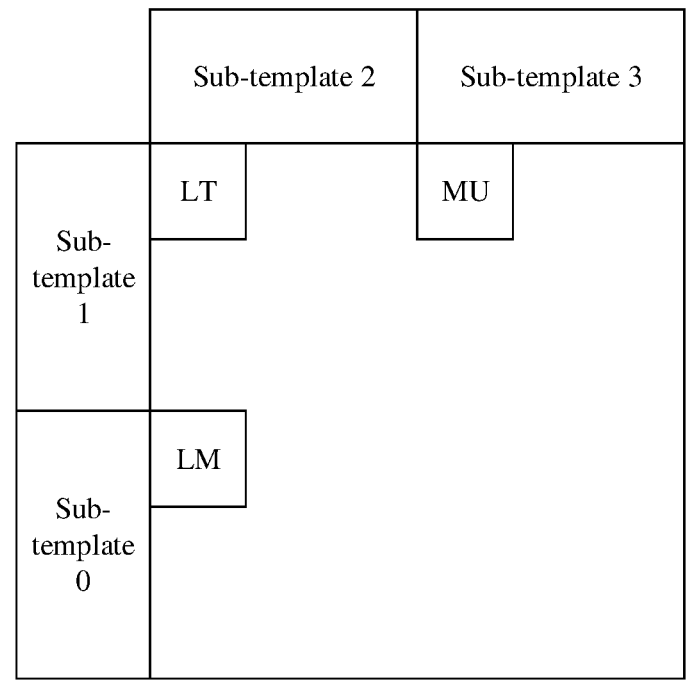
FIG. 13B is another specific example of three units of a current block according to an embodiment of the present disclosure.

In some other alternative embodiments, the first unit may be at the upper left corner position of the current block, the second unit may be at the right middle position of the current block, and the third unit may be at the upper middle position of the current block. Referring to FIG. 13B, as an example, the size of the current block is M×N, then the first cell may be at an upper left corner position (denoted as LT), the coordinates may be denoted as (0, 0), the second cell may be at a right middle position (denoted as LM), the coordinates may be denoted as (0, N/2), the third cell may be at an upper middle position (denoted as MU), and the coordinates may be denoted as M/2, 0).

It is to be noted that in the embodiments of the present disclosure, all the coordinates are coordinates relative to the upper left corner of the current block. In other words, in the embodiments of the present disclosure, the coordinates of the upper left corner position is marked as (0, 0) within a local range (i.e. inside the current block).

As a specific example, taking two modes (such as mode 0 and mode 1) with the lowest cost on the entire template of the current block being chosen as an example, referring to FIG. 13A, the weight of mode 0 at the lower left corner position can be represented as weight0LB, the weight at the upper left corner position can be represented as weight0LT, and the weight at the upper right corner position can be represented as weight0RT. As an example, the template of the current block is partitioned into sub-template 0, sub-template 1, sub-template 2 and sub-template 3. The weights of mode 0 at the above three positions can be shown by the following formulas (14)-(16), respectively:

$$weight0LT = \frac{costMode1Tem1 + costMode1Tem2}{costMode0Tem1 + costMode1Tem1 + costMode0Tem2 + costMode1Tem2} \quad (14)$$

$$weight0LB = \frac{costMode1Tem0}{costMode0Tem0 + costMode1Tem0} \quad (15)$$

$$weight0RT = \frac{costMode1Tem3}{costMode0Tem3 + costMode1Tem3} \quad (16)$$

As an example, the weight of mode 1 on the above three positions is 1 minus the weight of mode 0, respectively.

As another specific example, the mode with the lowest cost on the entire template of the current block and the mode with the lowest cost on the sub-template are chosen. Referring to FIG. 10, for example, the mode with the lowest cost on the entire template is mod 0, the mode with the lowest cost on the sub-template 1 is mode 1, and the mode with the lowest cost on the sub-template 2 is mode 2, the weight of each position may be calculated according to the costs of these modes in each template. Assuming that the cost of modeX on sub-template Y is costModeXtemY, where X takes values within the range of 0, 1, 2 and Y takes values within the range of 0, 1, 2. Referring to FIG. 13A and FIG. 13B, the upper left corner position LT may be denoted as pos0, the lower left corner position LB or the middle left position LU may be denoted as pos1, and the upper right corner position RT or the upper middle position MU may be denoted as pos2. Then, the weight of Mode X in posZ (Z is 0, 1, 2) can be denoted as weightXposZ.

Then, the weights of the three modes on posZ are shown in the following formulas:

$$weight1PosZ = \frac{costMode0TemZ + costMode2TemZ}{2*(costMode0TemZ + costMode1TemZ + costMode2TemZ)} \quad (17)$$

$$weight2PosZ = \frac{costMode0TemZ + costMode1TemZ}{2*(costMode0TemZ + costMode1TemZ + costMode2TemZ)} \quad (18)$$

$$weight0PosZ = 1 - weight1PosZ - weight2PosZ \quad (19)$$

where TemZ represents the template (or sub-template) corresponding to posZ. For example, for pos0, TemZ is the entire template, such as template 0, for pos1, TemZ is the nearest (e.g. adjacent) sub-template 1 to pos1, and for pos2, TemZ is the nearest (e.g. adjacent) sub-template 2 to pos2.

At operation 430, a first change rate of each of the at least two prediction modes in the first direction is determined according to the first weight, the second weight, the coordinates of the first unit and the coordinates of the second unit.

That is, the change rate of the prediction mode in the first direction can be determined according to the weights and coordinates of the first unit and the second unit. Exemplarily, when the first unit and the second unit are pixels, the first direction may be the direction of the line where the first unit and the second unit are located. When the first unit and the second unit are sub-blocks or portions, the first direction may be the direction of the line where the center of the first unit and the center of the second unit are located. As a specific example, in FIG. 13A and FIG. 13B, the first direction is a vertical direction.

In some alternative embodiments, a second change rate of each of the at least two prediction modes in the second direction according to the first weight, the third weight, the coordinates of the first unit and the coordinates of the third unit.

Exemplarily, when the first unit and the third unit are pixels, the second direction may be the direction of the line where the first unit and the third unit are located. When the first unit and the third unit are sub-blocks or portions, the second direction may be the direction of the line where the center of the first unit and the center of the third unit are located. As a specific example, in FIG. 13A and FIG. 13B, the second direction is a horizontal direction.

Alternatively, a linear model (e.g., a linear function) or a non-linear model (e.g., a quadratic function, or a cubic function, etc.) may be employed to derive the change rate of the weight in the first direction or the second direction. That is, when it is considered that the weights vary uniformly from point to point (or between sub-blocks or portions), a linear model can be used to calculate the change rate of the weights in the first direction or the second direction. On the other hand, the use of linear model may enable the computational complexity to be lower.

As a specific example, referring to FIG. 13A, when a linear model is used to calculate a first change rate of the weights in the vertical direction, the first change rate of mode 0 in the vertical direction may be represented as the following formula (20):

$$\frac{weight0LB - weight0LT}{N - 1} \quad (20)$$

When a linear model is used to calculate the second change rate of the weights in the horizontal direction, the second change rate of mode 0 in the horizontal direction may be represented as the following formula (21):

$$\frac{weight0RT - weight0LT}{M - 1} \quad (21)$$

As another specific example, referring to FIG. 13B, when the linear model is used to calculate a first change rate of the weights in the vertical direction, the first change rate of mode 0 in the vertical direction may be represented as the following formula (22):

$$\frac{2(weight0LM - weight0LT)}{N} \quad (22)$$

When a linear model is used to calculate the second change rate of the weights in the horizontal direction, the second change rate of mode 0 in the horizontal direction may be represented as the following formula (23):

$$\frac{2(weight0MU - weight0LT)}{M} \quad (23)$$

At operation 440, a fourth weight of each of the at least two prediction modes on a fourth unit is determined according to the first change rate and the coordinates of the fourth unit.

As an example, when the fourth unit is a pixel, the coordinates of the fourth cell may be denoted as (x, y). As a specific example, the fourth cell may be a pixel on the same line as the first cell and the second cell. At this case, the weight of each of at least two prediction modes on the fourth unit may be determined based on the first change rate of and the coordinates of the fourth unit.

In some alternative embodiments, the fourth weight may be determined based on the first change rate, the second change rate, and the coordinates of the fourth unit. Here, the fourth unit may be any unit in the current block.

As a specific example, continuing to refer to FIG. 13A, when the first change rate is represented as formula (20), the second change rate is represented as formula (21), and the fourth unit is represented as (x, y), the weight weight0XY of mode 0 on the fourth unit may be shown as formula (24):

$$weight0XY = \frac{weight0RT - weight0LT}{M - 1} x + \frac{weight0LB - weight0LT}{N - 1} y + weight0LB \quad (24)$$

It is to be noted that in formulas (20), (21) and (24), (M−1) or (N−1) is the denominator. In the field of video coding and decoding, M and N are generally an integer power of 2, such as 4, 8, 16, 32, etc. At this case, dividing by M or N can be performed by using right shift, which is hardware friendly. In some alternative implementations, the denominator (M−1) in formulas (20), (21) and (24) may be replaced with M, and (N−1) is replaced with N. That is, the coordinates of the lower left corner position in FIG. 13A can be replaced with (0, N), and the coordinates of the upper right corner position can be understood as (M, 0), so as to enable the calculation to be simple. At this case, it may be understood that the points at the lower left corner position and the upper right corner position are not on the whole pixel.

In some embodiments, when the granularity of the weight calculation is a sub-block or portion or pixel, an appropriate sub-block, or portion, or pixel may be selected, such that the denominator in the change rate formula is an integral power of 2, which is not limited herein.

As a specific example, continuing to refer to FIG. 13B, when the first change rate is represented as formula (22), the second change rate is represented as formula (23), and the fourth unit is represented as (x, y), the weight weight0XY of mode 0 on the fourth unit may be shown as formula (25):

$$weight0XY = \frac{2(weight0MU - weight0LT)}{M}x + \frac{2(weight0LM - weight0LT)}{N}y + weight0LB \quad (25)$$

It is to be noted that the maximum value of the weight value calculated by the formula (24) or (25) cannot exceed 1. If the calculated weight is greater than 1, the weight value should be clipped to 1. In addition, for each unit, the weight weight1XY occupied by mode 1 is 1 minus weight0XY, i.e., weight1XY=1−weight0XY.

At step 450, the intra prediction value of the current block is determined according to the first weights, the second weights and the fourth weights.

That is, the intra prediction value of the current block may be determined according to the weights of the at least two prediction modes on the units (e.g. sub-blocks, portions, or pixels, etc.) of the current block. For example, for each unit, the intra prediction value is the sum of the products of the intra prediction value of each mode in the unit and the weight of the mode on the unit.

Continuing with the examples in FIG. 13A and FIG. 13B, the predicted value predXY at (x, y) can be represented as the following formula (26):

$$predXY = pred0XY * weight0XY + pred1XY * weight1XY \quad (26)$$

In some embodiments, such as in actual implementation, in order to avoid the use of decimals, the manner of first amplifying and then normalizing may be used. For example, the weights may be enlarged by 8 times. In order to achieve the effect similar to rounding, an offset value may be added, and the final prediction value may be shifted to the right by 3 bits.

Therefore, in the embodiment of the present disclosure, after determining the weights of at least two prediction modes on at least two units (e.g., sub-blocks, portions, or pixels, etc.) of the current block, the change rate of the weights on a certain direction (e.g. vertical direction or horizontal direction) can be further determined according to the weights of the at least two units. The weights on other units of the current block may be determined according to the change rate in a smooth transition manner to determine the intra prediction value of the current block. In the embodiments of the disclosure, since the weights of at least two prediction modes on different units of the current block may be determined, different weights may be set for different points in the current block. Thus, it is helpful to more accurately determine the intra prediction value of the current block, thereby improving the compression efficiency.

The method of the embodiment of the present disclosure may be applied to the scenes with complex textures, such as the scenes with distorted lines, uneven surfaces, etc. That is, in these scenes with more complex textures, in the embodiments of the present disclosure, instead of encoding more residuals or partitioning smaller blocks to make the texture in a single block simple, the intra prediction is performed directly, so that the embodiments of the present disclosure can help to perform complex prediction by using as few flag bits as possible, thereby improving the compression efficiency.

The embodiment of the disclosure also provides a method for intra prediction. The template of the current block is partitioned into sub-templates, and a prediction mode is determined according to a cost of the candidate mode on the sub-template of the current block, and then the intra prediction value of the current frame is determined according to the prediction mode. In the embodiments of the disclosure, since the prediction mode is determined according to the sub-template, the cost of the prediction mode on the sub-template is small. That is, the prediction mode can perform well locally, thereby contributing to more accurate the intra prediction and further improving the compression efficiency.

FIG. 14 illustrates a schematic flowchart of another method 500 for intra prediction according to an embodiment of the present disclosure. The method 500 may be applied to an encoder, such as encoder 100 in FIG. 1, or to a decoder, such as decoder 200 in FIG. 2. Further, the method 500 may be applied to the intra prediction unit 106 in the encoder 100 or the intra prediction unit 204 in the decoder 200. As illustrated in FIG. 14, the method 500 includes operations 510 to 540.

At operation 510, a prediction mode parameter of a current block is acquired, herein the prediction mode parameter indicates that an intra prediction value of the current block is determined by using a TIMD mode.

At operation 520, a template of the current block is determined, herein the template includes at least two sub-templates.

More specifically, operations 510 and 520 may refer to the description of operations 310 and 320 in FIG. 3, and will not be elaborated here.

At operation 530, a prediction mode is determined according to costs of candidate modes on one or more of the at least two sub-templates.

As an example, when the entire template of the current block is partitioned into at least two sub-templates, the one or more of the sub-templates may be a part of the at least two sub-templates, such as one sub-template, two sub-templates, or more, which is not limited herein.

Specifically, when the template of the current block is partitioned into a plurality of portions, the correlation of points close to each other in space is strong, while the correlation of points far from each other is weak. Taking partitioning the template into upper and left sub-templates (for example, in FIG. 8A) as an example, some pixels are close to the upper sub-template and far from the left sub-template, then these points have strong correlation with the upper sub-template. That is, the intra prediction mode that performs well on the upper sub-template is more suitable for these pixels. However, some intra prediction modes perform well on the upper sub-template, and perform poorly on the left template, resulting in poor performance of these modes on the entire template. Thus these modes may be abandoned in the prior art. However, in the embodiments of the present disclosure, these intra prediction modes may be utilized when the prediction mode is determined according to the cost of the candidate modes on part of the sub-templates.

Exemplarily, some candidate modes may be tried on the sub-templates of the current block, respectively, for example, the mode with lowest cost on each sub-template is selected as the prediction mode.

In some alternative embodiments, at least two prediction modes may also be determined according to the costs of the candidate modes on one or more of at least two sub-templates, and the costs of the candidate modes on the template (i.e., the entire template of the current block). That is, in the embodiments of the present disclosure, the prediction mode determined may include a mode that performs well on the sub-template of the current block, and may also include a mode that performs well on the entire template of the current block. Specifically, it may refer to FIG. 10 and the related description above.

In some alternative embodiments, a mode that performs well (i.e., at a low cost) on a local template may not necessarily perform well on the entire template, as such, further limitations may be set when selecting at least two prediction modes. For example, the respective costs of the at least two prediction modes on the entire template may not exceed a first value, herein the first value is a preset threshold, or the first value is an integer multiple (e.g., 2 times) of the cost of the mode (i.e. mode 0) with the lowest cost on the entire template (e.g., costMode0), or otherwise, which is not limited herein.

As a specific example, when mode 0, mode 1 and mode 2 are the modes with the lowest cost on the entire template, sub-template 1 and sub-template 2 of the current block, respectively, the cost of mode 1 or mode 2 on the entire template may be further set to not exceed 2 times of costMode0.

At operation 540, the intra prediction value of the current block is determined according to the prediction mode.

In some embodiments, when the prediction mode is one, the intra prediction value of the current block may be calculated according to the prediction mode.

In some embodiments, when there are at least two prediction modes, the weight of each of the at least two prediction modes on the current block may be determined according to the respective costs of the at least two prediction modes on the sub-template. Then the intra prediction value of the current block may be determined according to the respective weights of the at least two prediction modes on the current block.

As a specific implementation, the at least two prediction modes have the same weight on each unit of the current block.

As another specific implementation, the at least two prediction modes have different weights on different units of the current block. Alternatively, the method 500 may also include partitioning the current block into at least two units. Then, the weight of each of the at least two prediction modes on the first unit is determined according to the respective costs of the at least two prediction modes on the sub-template. The at least two units include the first unit. Thereafter, the intra prediction value of the current block may be determined according to the respective weights of the at least two prediction modes on the first unit.

That is, the weights of the at least two prediction modes on different units of the current block may be calculated according to the costs of the at least two prediction modes on the different sub-templates of the template. Alternatively, when the weight of each of the at least two prediction modes on the first unit is determined according to the costs of the at least two prediction modes on the sub-template, the sub-template includes the sub-template closest to the first unit of the two sub-templates, for example, the sub-template may be adjacent to the first unit. Specifically, the weight may be determined with reference to methods 300 or 400 above, which is not limited herein.

Therefore, in the embodiments of the disclosure, the template of the current block is partitioned into sub-templates, and the prediction mode is determined according to the costs of the candidate modes on the sub-templates of the current block, and then the intra prediction value of the current frame is determined according to the prediction mode. Since the prediction mode is determined according to the sub-template, the cost of the prediction mode on the sub-template is small. That is, the prediction mode can perform well locally, thereby contributing to more accurate the intra prediction and further improving the compression efficiency.

Further, in the embodiments of the disclosure, since the weight of each of at least two prediction modes on different units (for example, sub-blocks, portions, or pixels, etc.) of the current block may be determined, different weights may be set for different units of the current block. Thus, the embodiments of the disclosure are helpful to more accurately determine the intra prediction value of the current block, thereby improving the compression efficiency.

It is to be noted that in the embodiment of the present disclosure, the method for intra prediction may be applied to both an encoder and a decoder, which is not limited in the present disclosure. With the method for intra prediction provided by the embodiment of the present disclosure, a better prediction effect can be acquired at the encoder 100 to improve the coding performance. Accordingly, the video decoding recovery quality may also be improved at the decoder 200, thereby improving the decoding performance. Specifically, the encoder encodes or attempts to encode the TIMD, and when the decoder decodes the TIMD, the encoding process and the decoding process may use the same preset rules or operations, such as the above-mentioned method 300, or method 400, or method 500, to calculate the predicted value of the TIMD mode. In other words, given the TIMD mode, the process of generating the prediction block by using the TIMD mode is the same at the encoding end and the decoding end.

The specific embodiments of the present disclosure have been described in detail with reference to the accompanying drawings. However, the present disclosure is not limited to the specific details in the above embodiments. various simple modifications can be made to the technical solution of the present disclosure within the technical conception scope of the present disclosure, and these simple modifications all belong to the protection scope of the present disclosure. For example, each of the specific technical features described in the above specific embodiments may be combined in any suitable manner without contradiction, and various possible combinations are not further described in the present disclosure in order to avoid unnecessary repetition. For another example, any combination may be made between the various embodiments of the present disclosure, and the combination is likewise to be regarded as the disclosure of the present disclosure so long as it does not depart from the concept of the present disclosure.

It is further to be understood that, in various method embodiments of the present disclosure, the values of the sequence numbers of the above-described processes do not mean the sequence of execution, and the execution order of each process should be determined by its function and inherent logic, and should not limit the implementation of the embodiments of the present disclosure. It is to be understood that these sequence numbers can be interchanged when appropriate, so that the embodiments of the disclosure can be implemented in an order other than those illustrated or described herein.

The method embodiments of the present disclosure are described in detail above with reference to FIG. 1 to FIG. 14 and the apparatus embodiments of the present disclosure are described in detail below with reference to FIG. 15 and FIG. 16.

FIG. 15 is a schematic block diagram of an apparatus 700 for intra prediction according to an embodiment of the present disclosure. The apparatus may be an encoder, such as the encoder 100 in FIG. 1, or a decoder, such as the decoder 200 in FIG. 1. As illustrated in FIG. 15 the apparatus 700 may include an acquisition unit 710 and a determination unit 720.

The acquisition unit 710 is configured to acquire a prediction mode parameter of a current block, the prediction mode parameter indicates that an intra prediction value of the current block is determined by using a TIMD mode.

The determination unit 720 is configured to determine a template of the current block, herein the template includes at least two sub-templates.

The determination unit 720 is further configured to determine a weight of each of at least two prediction modes on a first unit of the current block according to respective costs of the at least two prediction modes on a first sub-template, herein the at least two sub-templates include the first sub-template; and The determination unit 720 is further configured to determine the intra prediction value of the current block according to the respective weights of the at least two prediction modes on the first unit.

In some alternative embodiments, the first sub-template includes a sub-template of at least two sub-templates which is closest to the first unit.

In some alternative embodiments, the determination unit 720 is specifically configured to perform following operation.

The weight of each of the at least two prediction modes on the first unit is determined according to the respective costs of the at least two prediction modes on the first sub-template and respective costs of the at least two prediction modes on a second sub-template, herein the at least two sub-templates include the second sub-template.

In some alternative embodiments, a distance between the first sub-template and the first unit is less than a distance between the second sub-template and the first unit, and the costs of the at least two prediction modes on the first sub-template have a greater impact on the weights than the costs of the at least two prediction modes on the second sub-template.

In some alternative embodiments, the determination unit 720 is specifically configured to perform following operation.

The weight of each of the at least two prediction modes on the first unit is determined according to the respective costs of the at least two prediction modes on the first sub-template and respective costs of the at least two prediction modes on the template.

In some alternative embodiments, the determination unit 720 is further configured to determine a weight of each of the at least two prediction modes on the second unit of the current block according to respective costs of the at least two prediction modes on the template, and determine the intra prediction value of the current block according to the respective weights of the at least two prediction modes on the first unit and the respective weights of the at least two prediction modes on the second unit.

In some alternative embodiments, the first unit includes a sub-block, a portion, or a pixel of the current block.

In some alternative embodiments, a partitioning unit is further included. The partitioning unit is configured to partition the current block into at least two units, herein the at least two units include the first unit.

In some alternative embodiments, the at least two prediction modes are determined according to costs of the candidate modes on the template, and/or costs of the candidate modes on one or more of at least two sub-templates.

In some alternative embodiments, in a case that the at least two prediction modes are determined according to the costs of candidate modes on one or more of the at least two sub-templates, the respective costs of the at least two prediction modes on the template do not exceed a first value. The first value is a preset threshold or an integer multiple of a cost of the first prediction mode on the template, and the first prediction mode is a mode with a lowest cost on the template.

In some alternative embodiments, the at least two sub-templates include at least one of: a pixel block adjacent to a left side of the current block, a pixel block adjacent to an upper side of the current block, a pixel block at upper left of the current block, a pixel block at lower left of the current block, or a pixel block at upper right of the current block.

In some alternative embodiments, the current block includes a CU or a PU.

It is to be understood that apparatus embodiments and method embodiments may correspond to each other and similar descriptions may refer to the method embodiments. It will not be elaborated here to avoid redundancy. Specifically, in the embodiment, the apparatus 700 for intra prediction may correspond to a corresponding the entity performing the method 300 in the embodiments of the present disclosure, and the aforementioned and other operations and/or functions of the modules of the apparatus 700 for intra prediction for implementing the methods in FIG. 7 or the corresponding flow of the method in FIG. 7, and will not be elaborated here for brevity.

The apparatus and system according to the embodiments of the present disclosure are described above from the perspective of the functional modules with reference to the accompanying drawings. It is to be understood that the functional modules may be implemented in hardware form, by the instructions in software form, or by a combination of hardware and software modules. In particular, each step of the method embodiments of the present application can be completed by the integrated logic circuit of the hardware in the processor and/or the instruction in the form of software, and the operations of the method disclosed in combination with the embodiments of the present disclosure can be directly embodied as being performed by the hardware decoding processor or performed by the combination of the hardware and software modules in the decoding processor. Alternatively, the software module can be located in random memory, flash memory, read-only memory, programmable read-only memory, electrically erasable programmable memory, register or other mature storage media in the art. The storage medium is located in the memory, and the processor reads the information in the memory and completes the operations of the above method embodiments in combination with its hardware.

FIG. 16 is a schematic block diagram of an electronic device 800 according to an embodiment of the present disclosure.

As illustrated in FIG. 16, the electronic device 800 may include:

a memory 810 and a processor 820, the memory is configured to store a computer program and transmitting the program code to the processor 820. In other words, the processor 820 can call and execute the computer program from memory 810 to implement the method for intra prediction in the embodiments of the disclosure.

For example, the processor 820 may be configured to perform the operations in the above described methods 300, 400 or 500 in accordance with instructions in the computer program.

In some embodiments of the present disclosure, the processor 820 may include, but is not limited to:

general purpose processors, digital signal processors (DSPs), application specific integrated circuits (ASICs), field programmable gate arrays (FPGAs) or other programmable logic devices, discrete gate or transistor logic devices, and discrete hardware components, etc.

In some embodiments of the present disclosure, the memory 810 includes, but is not limited to:

volatile memory and/or nonvolatile memory. The nonvolatile memory can be read-only memory (ROM), programmable ROM (PROM), erasable Prom (EPROM), electrically erasable EPROM (EEPROM) or flash memory. Volatile memory can be random access memory (RAM), which is used as an external cache. By way of exemplary illustration, but not limitation, many forms of RAM are available, such as static RAM (SRAM), dynamic RAM (DRAM), synchronous DRAM (SDRAM), double data rate SDRAM (DDR SDRAM, enhanced SDRAM (ESDRAM), synch link DRAM (SLDRAM) and direct Rambus RAM (DR RAM).

In some embodiments of the present disclosure, the computer program may be divided into one or more modules that are stored in the memory 810 and executed by the processor 820 to complete the coding method provided herein. The one or more modules may be a series of computer program instruction segments capable of performing a particular function, the computer program instruction segments are used to describe the execution process of the computer program in the electronic device 800.

Optionally, as illustrated in FIG. 16, the electronic device 800 may further include a transceiver 830.

The transceiver 830 may be connected to the processor 820 or the memory 810.

The processor 820 may control the transceiver 830 to communicate with other devices, particularly, to transmit information or data to other devices or receive information or data transmitted by other devices. The transceiver 830 may include a transmitter and a receiver. The transceiver 830 may further include an antenna, and the number of the antennas may be one or more.

It is to be understood that the various components in the electronic device 800 are connected through a bus system, and the bus system includes a power bus, a control bus and a status signal bus in addition to a data bus.

According to one aspect of the present disclosure, a communication apparatus is provided. The communication device includes a processor and a memory. The memory is configured to store a computer program, and the processor is configured to invoke and run the computer program stored in the memory to cause the encoder to execute the method of the method embodiments described above.

According to one aspect of the present disclosure, there is provided a computer storage medium having stored thereon a computer program that, when executed by a computer, causes the computer to perform the method of the method embodiments described above. Alternatively, in the embodiments of the present disclosure, it is also provided a computer program product including instructions that, when executed by a computer, cause the computer to perform the method of the method embodiments described above.

According to another aspect of the present disclosure, a computer program product or computer program is provided. The computer program product or computer program includes computer instructions stored in a computer readable storage medium. A processor of a computer device reads the computer instructions from a computer-readable storage medium, and the processor performs the computer instructions so that the computer device performs the method of the method embodiments described above.

In other words, when implemented in software, it can be implemented in whole or in part in the form of a computer program product. The computer program product includes one or more computer instructions. When the computer program instructions are loaded and performed on a computer, the flows or functions according to the embodiments of the present disclosure are generated in whole or in part. The computer may be a general purpose computer, a special purpose computer, a computer network, or other programmable apparatus. The computer instruction may be stored in a computer-readable storage medium, or transmitted from a computer-readable storage medium to another computer-readable storage medium. For example, the computer instruction may be transmitted from a Web site, computer, server, or data center to another Web site, computer, server, or data center by wired (e.g. coaxial cable, optical fiber, digital subscriber line (DSL)) or wireless (e.g. infrared, wireless, microwave, etc.) manner. The computer-readable storage medium may be any usable medium accessible to a computer or a data storage device (such as a server, data center, etc.) containing one or more usable media integration. The usable medium may be a magnetic medium (e.g., a floppy disk, hard disk, magnetic tape), an optical medium (e.g., a digital video disc (DVD)), or a semiconductor medium (e.g., a solid state disk (SSD)), etc.

The embodiment of the disclosure provides a method for intra prediction, an encoder, a decoder and a coding and decoding system. Different weights are set for different units of the current block, which is helpful to determine the intra prediction value of the current block more accurately, thereby improving the compression efficiency.

In a first aspect, there is provided a method for intra prediction. The method is applied to an encoder, and includes: acquiring a prediction mode parameter of a current block, herein the prediction mode parameter indicates that an intra prediction value of the current block is determined by using a TIMD mode; determining a template of the current block, herein the template includes at least two sub-templates; determining a weight of each of at least two prediction modes on a first unit of the current block according to respective costs of the at least two prediction modes on a first sub-template, herein the at least two sub-templates include the first sub-template; and determining the intra prediction value of the current block according to the respective weights of the at least two prediction modes on the first unit.

In a second aspect, there is provided a method for intra prediction. The method is applied to a decoder, and includes: acquiring a prediction mode parameter of a current block, herein the prediction mode parameter indicates that an intra prediction value of the current block is determined by using a TIMD mode; determining a template of the current block, herein the template includes at least two sub-templates; determining a weight of each of at least two prediction modes on a first unit of the current block according to respective costs of the at least two prediction modes on a first sub-template, herein the at least two sub-templates include the first sub-template; and determining the intra prediction value of the current block according to the respective weights of the at least two prediction modes on the first unit.

In a third aspect, an encoder is provided, and the encoder includes: an acquisition unit, configured to acquire a prediction mode parameter of a current block, herein the prediction mode parameter indicates that an intra prediction value of the current block is determined by using a TIMD mode; and a determination unit, configured to determine a template of the current block, herein the template includes at least two sub-templates, herein the determination unit is further configured to determine a weight of each of at least two prediction modes on a first unit of the current block according to respective costs of the at least two prediction modes on a first sub-template, herein the at least two sub-templates include the first sub-template; and the determination unit is further configured to determine the intra prediction value of the current block according to the respective weights of the at least two prediction modes on the first unit.

In a fourth aspect, a decoder is provided, and the decoder includes: an acquisition unit, configured to acquire a prediction mode parameter of a current block, herein the prediction mode parameter indicates that an intra prediction value of the current block is determined by using a TIMD mode; and a determination unit, configured to determine a template of the current block, herein the template includes at least two sub-templates, herein the determination unit is further configured to determine a weight of each of at least two prediction modes on a first unit of the current block according to respective costs of the at least two prediction modes on a first sub-template, herein the at least two sub-templates include the first sub-template; and the determination unit is further configured to determine the intra prediction value of the current block according to the respective weights of the at least two prediction modes on the first unit.

In a fifth aspect, an electronic device is provided, and the electronic device includes a processor and a memory. The memory is configured to store a computer program, and the processor is configured to call and execute the computer program stored in the memory, to perform the above-mentioned method in the first aspect.

In a sixth aspect, a coding and decoding system is provided. The system includes an encoder of the third aspect and a decoder of the fourth aspect.

In a seventh aspect, a chip is provided. The chip includes a processor, configured to call and execute a computer program from a memory, to cause a device installed with the chip to perform the above-mentioned first or second method.

In an eighth aspect, there is provided a computer-readable storage medium for storing a computer program that causes a computer to perform the method of the first aspect or the second aspect described above.

In a ninth aspect, there is provided a computer program product including computer program instructions that cause a computer to perform the method of the first or second aspect described above.

In a tenth aspect, there is provided a computer program that, when run on a computer, causes the computer to perform the method of the first aspect or the second aspect.

In the embodiments of the present disclosure, at least two sub-templates of the current block are determined, thus the weight of each of the at least two prediction modes on the first unit of the current block is determined according to the respective costs of the at least two prediction modes on the sub-templates, and then the prediction value of the current block is determined according to the weights. In the embodiments of the disclosure, since the weights of at least two prediction modes on different units of the current block may be determined, different weights may be set for different units of the current block. Thus, it is helpful to more accurately determine the intra prediction value of the current block, thereby improving the compression efficiency.

For example, by calculating the weights of the prediction modes on each unit (e.g., sub-block, portion, or pixel) of the current block, it is possible to give more weight to a mode with better performance and less weight to a mode with poor performance on one unit as much as possible. That is, a greater weight is provided to a mode on the position (e.g. sub-block, portion, or pixel) on which the prediction effect of the mode is good, while a less weight is provided to a mode on the position on which the prediction effect of the mode is poor. As such, it is more reasonable than the method of unifying the weights on the entire current block, so that a prediction block with more complex texture can be produced.

The method of the embodiments of the present disclosure may be applied to the scenes with complex textures, such as the scenes with distorted lines, uneven surfaces, etc. That is, in these scenes with more complex textures, in the embodiments of the present disclosure, instead of encoding more residuals or partitioning smaller blocks to make the texture in a single block simple, the intra prediction is performed directly, so that the embodiments of the present disclosure can help to perform complex prediction by using as few flag bits as possible, thereby improving the compression efficiency.

It is to be understood that in the embodiments of the present disclosure, "B corresponding to A" means that B is associated with A. In one implementation, B may be determined from A. However, it is further to be understood that determining B from A does not mean determining B from A alone, but may also be determined from A and/or other information.

In the description of the present disclosure, "at least one" refers to one or more, and "multiple" refers to two or more, unless otherwise stated. In addition, the term "and/or" describes an association relationship of associated objects and represents that three relationships may exist. For example, A and/or B may represent the following three cases: only A exists, both A and B exist, and only B exists. A and B may be singular or plural. The character "/"

generally means that the associated objects has an "or" relationship. "At least one of the following" or similar expressions refers to any combination of these items, including any combination of single item or plural items. For example, at least one of a, b, or c may represent a, b, c, a-b, a-c, b-c, or a-b-c, where a, b, c may be single or multiple.

It is further to be understood that in the embodiments of the present disclosure, the description of first and second are for the purpose of illustrating and distinguishing the described objects only, and are not in any order, nor do they indicate any particular limitation to the number of devices in the embodiments of the present disclosure, and cannot constitute any limitation on the embodiments of the present disclosure.

It is further to be understood that specific features, structures, or characteristics related to the embodiments in the description are included in at least one embodiment of the present disclosure. Further these specific features, structures or characteristics may be incorporated in any suitable manner in one or more embodiments.

In addition, the terms "including" and "having" and any variations thereof are intended to cover non-exclusive inclusion. For example, a process, method, system, product, or server including a series of steps or units need not be limited to those steps or units that explicitly listed, but may include other steps or units that are not explicitly listed or that are inherent to the process, method, product, or device.

Those of ordinary skill in the art may realize that the modules and algorithm steps of the various examples described in combination with the disclosed embodiments herein can be implemented by the combination of electronic hardware, or computer software and electronic hardware. Whether these functions are performed in hardware or software depends on the specific application and design constraints of the technical solution. A professional technician may use different methods to implement the described functions for each specific application, but such implementation shall not be considered beyond the scope of the present disclosure.

In several embodiments provided by the present disclosure, it is to be understood that the disclosed devices, apparatus and methods can be implemented in other ways. For example, the embodiment of the apparatus described above is only schematic. For example, the division of the modules is only a logical function division, and there can be another division method in actual implementation, for example, multiple modules or components can be combined or integrated into another system, or some features can be ignored or not implemented. On the other hand, the mutual coupling or direct coupling or communication connection illustrated or discussed can be indirect coupling or communication connection through some interfaces, apparatuses or modules, and can be electric, mechanical or other forms.

The module described as a separation part may or may not be physically separated, and the component displayed as a module may or may not be a physical module, that is, it may be located in one place, or it may be distributed to multiple network units. Some or all of the modules can be selected according to the actual needs to achieve the purpose of the embodiment. For example, each functional module in each embodiment of the present disclosure may be integrated in one processing module, each module may exist physically alone, or two or more modules may be integrated in one module.

The above are only the specific embodiments of the present disclosure, and is not intended to limit the scope of protection of the embodiments of the present disclosure.

Any change and replacement is easily to think within the technical scope of the embodiments of the present by those skilled in the art, and fall with the protection scope of the present disclosure. Therefore, the scope of protection of the embodiments of the present disclosure shall be subject to the scope of protection of the claims.

The invention claimed is:

1. A method for intra prediction, applied to an encoder, the method comprising:
   acquiring a prediction mode parameter of a current block, wherein the prediction mode parameter indicates that an intra prediction value of the current block is determined by using a Template-based Intra Mode Derived (TIMD) mode;
   determining a template of the current block, wherein the template comprises at least two sub-templates;
   determining a weight of each of at least two prediction modes on a first unit of the current block according to respective costs of the at least two prediction modes on a first sub-template, wherein the at least two sub-templates comprise the first sub-template; and
   determining the intra prediction value of the current block according to the respective weights of the at least two prediction modes on the first unit.

2. The method of claim 1, wherein the first sub-template comprises a sub-template of the at least two sub-templates which is closest to the first unit.

3. The method of claim 1, wherein determining the weight of each of the at least two prediction modes on the first unit according to the respective costs of the at least two prediction modes on the first sub-template comprises:
   determining the weight of each of the at least two prediction modes on the first unit according to the respective costs of the at least two prediction modes on the first sub-template and respective costs of the at least two prediction modes on a second sub-template, wherein the at least two sub-templates comprise the second sub-template.

4. The method of claim 3, wherein a distance between the first sub-template and the first unit is less than a distance between the second sub-template and the first unit, and the costs of the at least two prediction modes on the first sub-template have a greater impact on the weights than the costs of the at least two prediction modes on the second sub-template.

5. The method of claim 1, wherein determining the weight of each of the at least two prediction modes on the first unit according to the respective costs of the at least two prediction modes on the first sub-template comprises:
   determining the weight of each of the at least two prediction modes on the first unit according to the respective costs of the at least two prediction modes on the first sub-template and respective costs of the at least two prediction modes on the template.

6. The method of claim 1, further comprising:
   determining a weight of each of the at least two prediction modes on a second unit of the current block according to respective costs of the at least two prediction modes on the template,
   wherein determining the intra prediction value of the current block according to the respective weights of the at least two prediction modes on the first unit comprises:
   determining the intra prediction value of the current block according to the respective weights of the at least two prediction modes on the first unit and the respective weights of the at least two prediction modes on the second unit of the current block.

7. The method of claim 1, wherein the first unit comprises a sub-block, a portion or a pixel of the current block.

8. The method of claim 1, further comprising:
partitioning the current block into at least two units, wherein the at least two units comprise the first unit.

9. The method of claim 1, wherein the at least two prediction modes are determined according to at least one of: costs of candidate modes on the template, or costs of the candidate modes on one or more of the at least two sub-templates.

10. The method of claim 9, wherein in a case that the at least two prediction modes are determined according to the costs of the candidate modes on one or more of the at least two sub-templates, the respective costs of the at least two prediction modes on the template do not exceed a first value, wherein the first value is a preset threshold or an integer multiple of a cost of the first prediction mode on the template, and the first prediction mode is a mode with a lowest cost on the template.

11. The method of claim 1, wherein the at least two sub-templates comprise at least one of: a pixel block adjacent to a left side of the current block, a pixel block adjacent to an upper side of the current block, a pixel block at upper left of the current block, a pixel block at lower left of the current block, or a pixel block at upper right of the current block.

12. The method of claim 1, wherein the current block comprises a Coding Unit (CU) or a Prediction Unit (PU).

13. A method for intra prediction, applied to a decoder, the method comprising:
acquiring a prediction mode parameter of a current block, wherein the prediction mode parameter indicates that an intra prediction value of the current block is determined by using a Template-based Intra Mode Derived (TIMD) mode;
determining a template of the current block, wherein the template comprises at least two sub-templates;
determining a weight of each of at least two prediction modes on a first unit of the current block according to respective costs of the at least two prediction modes on a first sub-template, wherein the at least two sub-templates comprise the first sub-template; and
determining the intra prediction value of the current block according to the respective weights of the at least two prediction modes on the first unit.

14. An encoder, comprising:
a processor; and
a memory, configured to store a computer program executable by the processor,
wherein the processor is configured to:
acquire a prediction mode parameter of a current block, wherein the prediction mode parameter indicates that an intra prediction value of the current block is determined by using a Template-based Intra Mode Derived (TIMD) mode;
determine a template of the current block, wherein the template comprises at least two sub-templates;
determine a weight of each of at least two prediction modes on a first unit of the current block according to respective costs of the at least two prediction modes on a first sub-template, wherein the at least two sub-templates comprise the first sub-template; and
determine the intra prediction value of the current block according to the respective weights of the at least two prediction modes on the first unit.

15. The encoder of claim 14, wherein the first sub-template comprises a sub-template of the at least two sub-templates which is closest to the first unit.

16. The encoder of claim 14, wherein the processor is configured to:
determine the weight of each of the at least two prediction modes on the first unit according to the respective costs of the at least two prediction modes on the first sub-template and respective costs of the at least two prediction modes on a second sub-template, wherein the at least two sub-templates comprise the second sub-template.

17. The encoder of claim 16, wherein a distance between the first sub-template and the first unit is less than a distance between the second sub-template and the first unit, and the costs of the at least two prediction modes on the first sub-template have a greater impact on the weights than the costs of the at least two prediction modes on the second sub-template.

18. The encoder of claim 14, wherein the processor is configured to:
determine the weight of each of the at least two prediction modes on the first unit according to the respective costs of the at least two prediction modes on the first sub-template and respective costs of the at least two prediction modes on the template.

19. The encoder of claim 14, wherein the processor is further configured to:
determine a weight of each of the at least two prediction modes on a second unit of the current block according to respective costs of the at least two prediction modes on the template,
wherein the processor is configured to:
determine the intra prediction value of the current block according to the respective weights of the at least two prediction modes on the first unit and the respective weights of the at least two prediction modes on the second unit of the current block.

20. A decoder, comprising:
a processor; and
a memory, configured to store a computer program executable by the processor,
wherein the processor is configured to:
acquire a prediction mode parameter of a current block, wherein the prediction mode parameter indicates that an intra prediction value of the current block is determined by using a Template-based Intra Mode Derived (TIMD) mode;
determine a template of the current block, wherein the template comprises at least two sub-templates;
determine a weight of each of at least two prediction modes on a first unit of the current block according to respective costs of the at least two prediction modes on a first sub-template, wherein the at least two sub-templates comprise the first sub-template; and
determine the intra prediction value of the current block according to the respective weights of the at least two prediction modes on the first unit.

* * * * *